United States Patent [19]

Tomita et al.

[11] Patent Number: 5,161,047
[45] Date of Patent: Nov. 3, 1992

[54] OPTICAL SCANNER FOR IMAGE RECORDING APPARATUS

[75] Inventors: Kan Tomita, Tokyo; Takayuki Ohsawa, Funabashi; Kenichi Takanashi, Inzai; Osamu Endo, Kawasaki, all of Japan

[73] Assignee: Ricoh Company, Ltd., Tokyo, Japan

[21] Appl. No.: 699,940

[22] Filed: May 14, 1991

[30] Foreign Application Priority Data

| | | | |
|---|---|---|---|
| May 15, 1990 | [JP] | Japan | 2-124526 |
| Jun. 5, 1990 | [JP] | Japan | 2-146825 |
| Jun. 5, 1990 | [JP] | Japan | 2-146826 |
| Jun. 5, 1990 | [JP] | Japan | 2-146827 |
| Oct. 11, 1990 | [JP] | Japan | 2-272933 |
| Oct. 11, 1990 | [JP] | Japan | 2-272934 |
| Oct. 11, 1990 | [JP] | Japan | 2-272935 |
| Mar. 15, 1991 | [JP] | Japan | 3-51647 |

[51] Int. Cl.$^5$ ............................................. G02B 26/10
[52] U.S. Cl. .......................................... 359/216; 359/206; 250/234; 346/160; 346/108
[58] Field of Search ............... 359/216, 217, 218, 219, 359/196, 232, 206; 250/234, 235, 236; 346/108, 157, 160

[56] References Cited

U.S. PATENT DOCUMENTS

| | | | |
|---|---|---|---|
| 3,520,625 | 7/1970 | Gillieron et al. | 250/234 |
| 3,787,107 | 1/1974 | Sick et al. | 250/234 |
| 4,253,724 | 3/1981 | Minoura et al. | 359/218 |
| 4,310,757 | 1/1982 | Check, Jr. et al. | 359/217 |
| 4,578,688 | 3/1986 | Okuno | 359/218 |
| 4,720,632 | 1/1988 | Kaneko | 250/235 |
| 4,722,581 | 2/1988 | Hamada et al. | 359/218 |

*Primary Examiner*—Loha Ben
*Attorney, Agent, or Firm*—Oblon, Spivak, McClelland, Maier & Neustadt

[57] ABSTRACT

An optical scanner having a deflecting device for reflecting and deflecting a laser beam issued from a light source device with a reflective surface thereof, and image forming optics for focusing the deflected laser beam onto a target surface to form a beam spot. A first aperture is interposed between the light source device and the deflecting device for correcting the diameter of the beam spot to be formed on the target surface. A second aperture is located on an optical axis between the first aperture and the target surface for intercepting, at least in a direction corresponding to subscanning, part of the light diffracted by the first aperture which lies outwardly of the first minimums.

16 Claims, 24 Drawing Sheets

Fig. 1C
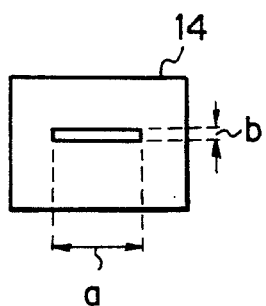
Fig. 1D
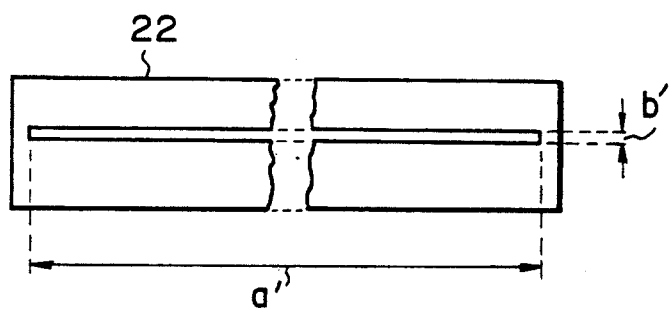
Fig. 1E
(a) 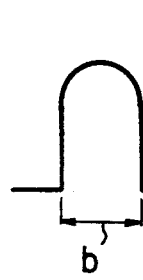  (b) 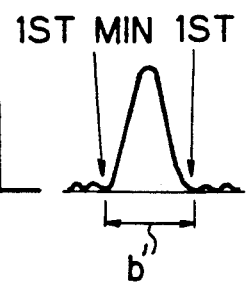  (c)   (d)   (e) 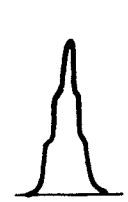

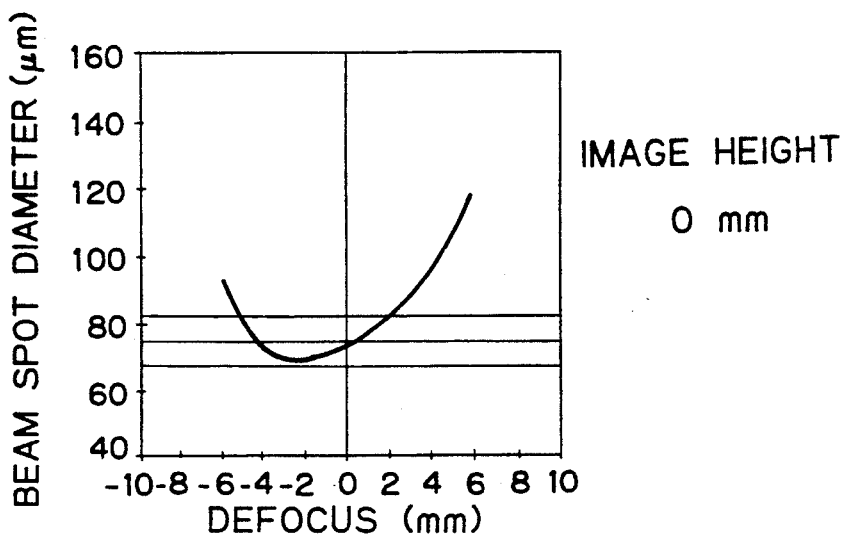
Fig. 18A — IMAGE HEIGHT 0 mm
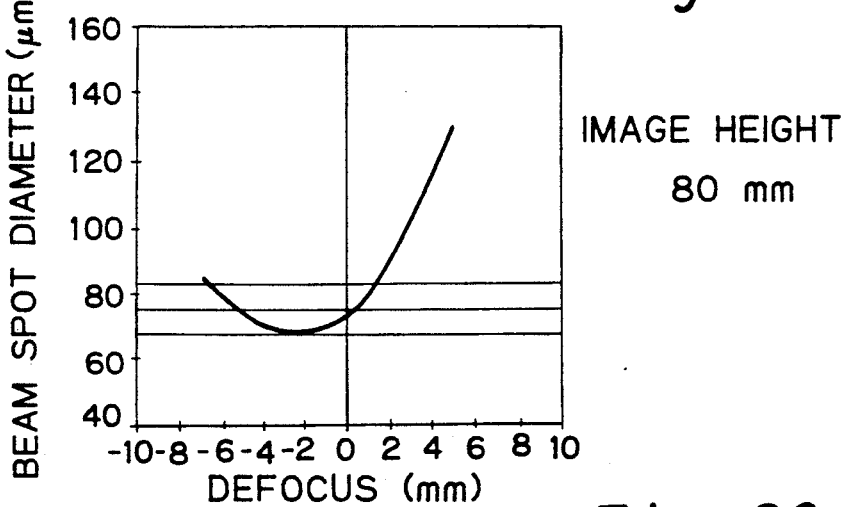
Fig. 18B — IMAGE HEIGHT 80 mm
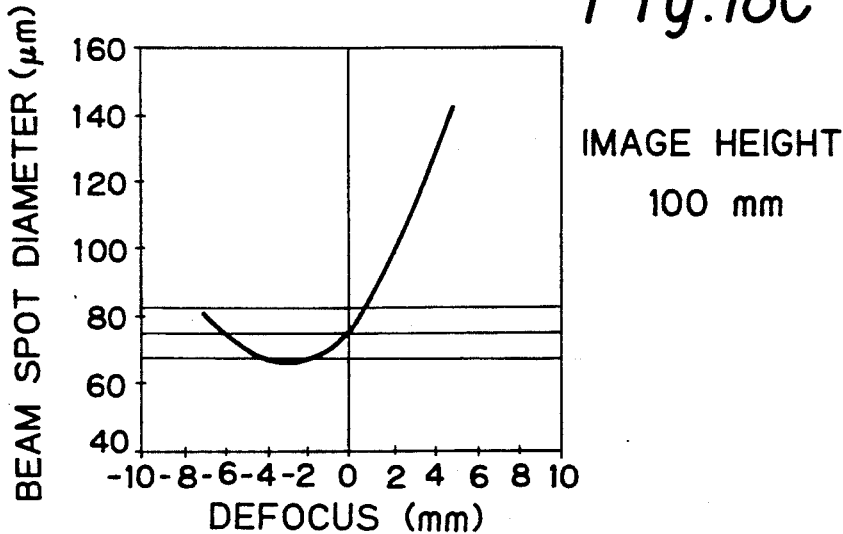
Fig. 18C — IMAGE HEIGHT 100 mm IMAGE HEIGHT
0 mm IMAGE HEIGHT
80 mm IMAGE HEIGHT
100 mm IMAGE HEIGHT 0 mm IMAGE HEIGHT 80 mm IMAGE HEIGHT 100 mm IMAGE HEIGHT
0 mm IMAGE HEIGHT
80 mm IMAGE HEIGHT
100 mm

OPTICAL SCANNER FOR IMAGE RECORDING APPARATUS

BACKGROUND OF THE INVENTION

The present invention relates to optical scanner for an image recording equipment.

An optical scanner, incorporated in a laser printer, digital copier or similar image recording apparatus, has a light source device, a deflecting device, and image forming optics. The deflecting device has a deflecting surface for reflecting and deflecting a light beam issued from the light source device. The light beam reflected by the deflecting device is focused by the optics onto a target surface to form a beam spot thereon. Assume that the optical arrangement extending from the light source device to the target surface is linearly developed along the optical axis, and let the resulted optical path be referred to as a developed optical path. Then, the start point and the end point of the developed optical path are the light source device and the target surface, respectively. The developed optical path is, therefore, perpendicular to the main scanning and subscanning directions at the end point thereof. The directions parallel to the main scanning and subscanning directions at any point on the developed optical path will hereinafter be referred to as a direction corresponding to main scanning and a direction corresponding to subscanning, respectively.

The deflecting device is implemented with a rotary polygonal mirror, galvano mirror, pyramidal mirror or similar mirror having a reflective surface. It is not practicable to hold the axis of rotation of such a deflecting mirror ideally in one direction, i.e., the axis of rotation slightly changes in direction. The change in the direction of the axis of rotation directly translates into a change in the deflected light beam in the direction corresponding to subscanning and, therefore, a change in the position of the beam spot on the target surface in the same direction. Regarding the polygonal mirror, for example, each of a plurality of reflective surfaces is not accurately parallel to the axis of rotation, also resulting in the change in the position of the beam spot in the above-mentioned direction. To eliminate this problem ascribable to the configuration of the deflecting device, image forming optics interposed between the deflecting device and the target surface may include an elongate anamorphic lens, as proposed in the past. The elongate anamorphic lens is situated in the vicinity of the target surface. Alternatively, the optics itself may be constituted by an anamorphic f-theta lens, as also proposed in the past.

Today, there is an increasing demand for high-quality image recording using optical scanning. Also, attempts have been made to render tones of an image in a dot pattern by changing the size of a dot which constitutes a pixel. To implement high-quality image recording or tones, it is preferable that the beam spot on the target surface be provided with a smooth optical intensity distribution analogous to a Gaussian distribution.

It is a common practice with an optical scanner to locate an aperture member between the light source device and the deflecting device for the purpose of regulating the beam spot to a predetermined diameter. The aperture member intercepts part of the parallel light beam issuing from the light source device and has an aperture which is usually as small as 0.3-0.6 millimeter in width. Such a small aperture brings about a problem that the aperture member intercepts, in the direction corresponding to subscanning, even the part of the light beam surrounding the center and having substantial optical intensity and thereby diffracts the light at the edges thereof. The diffracted light noticeably complicates the optical intensity distribution of the beam spot on the target surface. Especially, when use is made of an elongate anamorphic lens, the influence of the diffraction is prominent and, therefore, the intensity distribution of beam spot is extremely complicated, causing the beam spot to change in diameter and configuration with the image height. This obstructs high-density image recording and tone rendering. When the elongate anamorphic lens is replaced with anamorphic optics, or an anamorphic image forming lens system, the influence of diffraction is not noticeable so long as the curvature of the image surface of the lens system is small. However, when the curvature of the image surface is substantial, an image height area in which the beam spot changes in diameter and configuration appears due to the influence of diffraction.

SUMMARY OF THE INVENTION

It is therefore an object of the present invention to provide a new and useful optical scanner capable of reducing or fully eliminating the influence of diffraction effectively.

An optical scanner for focusing light issued from a light source onto a target surface to form a beam spot and scanning the target surface with the beam spot of the present invention comprises a light beam generating member for generating a light beam from the light issued from the light source, a deflecting device for reflecting the light beam from the light beam generating member and deflecting the reflected light beam, image forming optics for focusing the light beam deflected by the deflecting device onto the target surface as a beam spot, a first aperture member interposed between the light source and the deflecting device for correcting the diameter of the beam spot, and a second aperture member positioned on an optical path between the first aperture member and the target surface for intercepting, at least in a direction corresponding to subscanning, part of diffracted light from the first aperture member which is located outwardly of the first minimums.

BRIEF DESCRIPTION OF THE DRAWINGS

The above and other objects, features and advantages of the present invention will become more apparent from the following detailed description taken with the accompanying drawings in which:

FIG. 1C shows an aperture member;

FIG. 1D shows a slit plate;

FIG. 1E plots optical intensity distributions measured at a given position on a developed optical path;

FIGS. 18A-18C, 19A-19C and 20A-20C show depth characteristics relating to the embodiment of FIGS. 17A-17C;

DESCRIPTION OF THE PREFERRED EMBODIMENTS

Figure 1A:
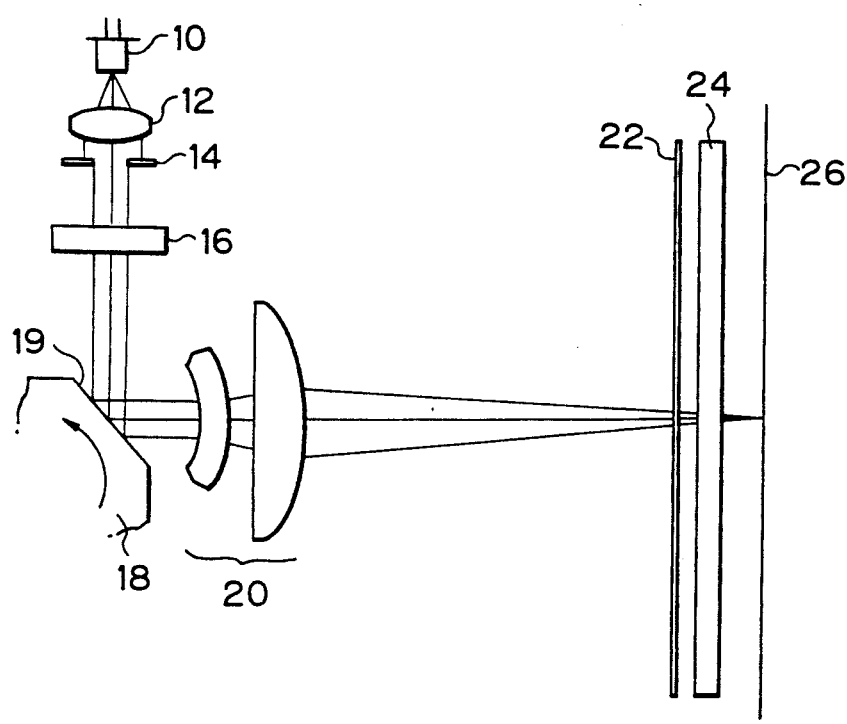
FIG. 1A shows an optical scanner embodying the present invention.

Referring to FIG. 1A of the drawings, an optical scanner embodying the present invention is shown as seen in a direction perpendicular to a plane which is swept by a deflected light beam. In the figure, the direction perpendicular to the sheet surface is the direction corresponding to subscanning. As shown, a light source in the form of a semiconductor laser 10 and a collimator lens 12 constitute a light source device in combination. A light beam issued from the laser 10 is collimated by the collimator lens 12 and then partly screened out by an aperture member 14. The light beam passed through an aperture formed in the aperture member 14 is transmitted through a cylindrical lens 16 which has positive power only in the direction perpendicular to the sheet surface of FIG. 1A (corresponding to subscanning). The light beam is then deflected by a reflective surface 19 of a polygonal mirror 18 which is rotating at a constant speed. As a result, the light beam reflected by the reflective surface 19 is incident to an f-theta lens 20 while being deflected at a constant angular speed. The light beam transmitted through the f-theta lens 20 is further partly screened out by a slit plate 22 which plays the role of aperture means. The light beam coming out of the slit plate 22 is incident to an elongate anamorphic lens 24 which is an elongate cylindrical lens and has positive power only in the direction corresponding to subscanning. The light beam transmitted through the anamorphic lens 24 forms a beam spot on a surface of interest or target surface 26.

Figure 1B:
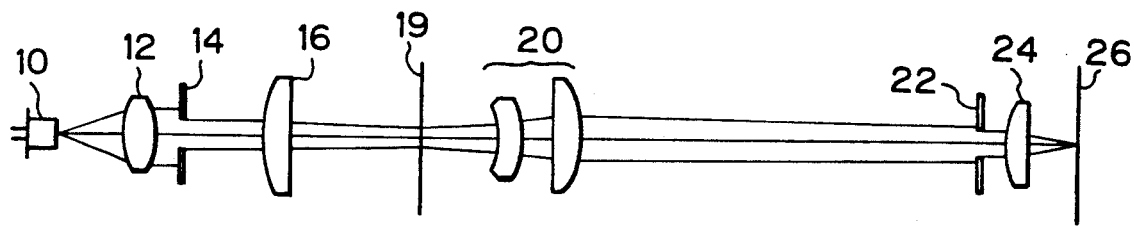
FIG. 1B shows an optical arrangement along a developed optical path.

The optical arrangement from the laser 10 to the target surface 26 appears as shown in FIG. 1B when drawn along a developed optical path such that the direction corresponding to subscanning is the vertical direction. As shown, the light beam transmitted through the cylindrical lens 16 is incident to the reflective surface 19 of the polygonal mirror 18 while being converged in the direction corresponding to subscanning. The cylindrical lens 16 mainly serves to regulate the diameter of the beam spot in the subscanning direction and, therefore, does not have much power. The focal point of the cylindrical lens 16 is deviated from the reflective surface 19 so that the beam spot formed on the target surface 26 may have a desired diameter (about 0.05-0.15 millimeter) as measured in the subscanning direction. The light beam reflected by the reflective surface 19 is incident of the f-theta lens 20 and then to the anamorphic lens 24 while being diverged. It follows that the beam spot on the target surface 26 is the image of the aperture of the aperture member 14 formed by the lenses 16, 20 and 24. Hence, the aperture of the aperture member 14 is located at a finite distance as seen from the target surface 26, resulting in noticeable influence of the diffraction by the aperture. On the other hand, regarding the direction corresponding to main scanning, the deflected light beam is incident to the f-theta lens 20 as a parallel beam and focused onto the target surface 26 only by the lens 20. Therefore, the aperture member 14 is located at an infinite point with respect to the f-theta lens 20, as seen from the target surface 26. As a result, the diffraction in the direction corresponding to main scanning is the Fraunhofer's diffraction and has little influence on the optical intensity distribution of the beam spot.

As shown in FIG. 1C, the aperture member 14 has an aperture having widths a and b in the directions corresponding to main scanning and subscanning, respectively. As shown in FIG. 1D, the slit plate 22 has a slit having a length a' in the direction corresponding to main scanning and a width b' in the direction corresponding to subscanning. Of course, the length a' of the slit plate 22 is selected in matching relation to the main scanning range of optical scanning. The slit width b' in the direction corresponding to subscanning is equal to the distance between the first minimums particular to the optical intensity distribution of the deflected light beam as measured at the position where the slit plate 22 is located. Specifically, in FIG. 1E, (a) indicates the optical intensity distribution of the light beam which has just passed the aperture member 14, as plotted in the direction corresponding to subscanning. This width of the light beam is regulated to the width b of the aperture member 14. In FIG. 1E, (b) indicates the optical intensity distribution of the light beam measured at the position of the slit plate 22 in the direction corresponding to subscanning. As shown, the intensity distribution (b) has a bell-like great peak and successive small peaks at opposite sides of the great peak due to the influence of the diffraction particular to the aperture member 14. In the intensity distribution (b), the distance between the first minimums is the width b'. In this configuration, the deflected light beam having just passed the slit plate 22 has lost the part thereof lying outside of the first minimums and has a clear Gaussian intensity distribution (c), FIG. 1E, in the direction corresponding to subscanning. When such a light beam is focused onto the target surface 26 by the anamorphic lens 24, it has a desirable Gaussian intensity distribution (d), FIG. 1E. The influence of diffraction is not noticeable in the direction corresponding to main scanning, as stated earlier. As a result, a desirable Gaussian intensity distribution is achievable on the target surface 26 in both of the main and subscanning directions. This allows the light beam to scan the target surface 26 in high density. Such an optical intensity distribution allows the diameter of the beam spot (diameter of the level whose intensity is $1/e^2$ of the intensity at the center of the beam spot) to follow a change in the emission intensity of the laser 10 accurately, thereby allowing tones to be rendered in a recorded image. When the slit plate 22 is not used, the beam spot on the target surface 26 will have an irregular intensity distribution (e), FIG. 1E, in the subscanning direction. With such an irregular distribution, it is difficult to record an image in high density or to render tones.

Figure 2A:
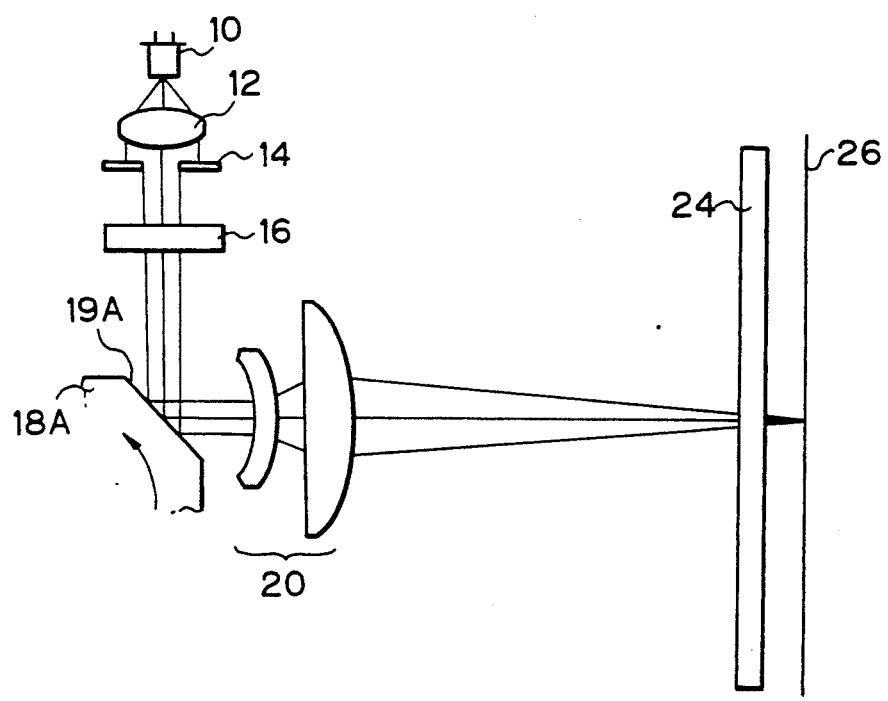
FIG. 2A shows an alternative embodiment of the present invention.
Figure 2B:
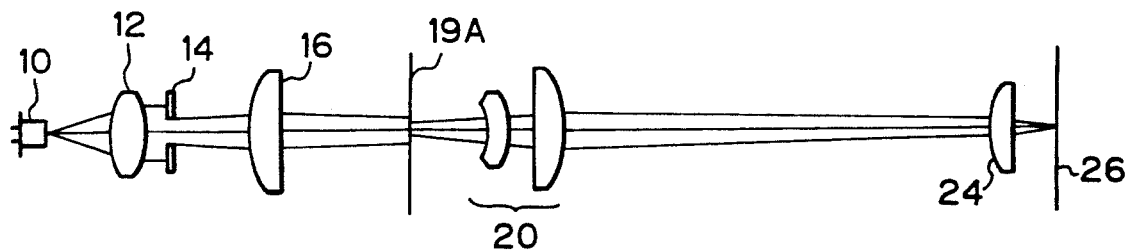
FIG. 2B shows an optical arrangement along a developed optical path.

Referring to FIGS. 2A-2D, an alternative embodiment of the present invention will be described. In FIG. 2A, the same components as the components shown in FIG. 1A are designated by the same reference numerals. This embodiment differs from the embodiment of FIGS. 1A-1E in that it lacks the slit plate 22 and has a polygonal mirror 18A shown in FIG. 2C. The relation shown in FIGS. 1A-1E is also true with this embodiment. The aperture of the aperture member 14 is located at an infinite point on the object side as seen from the target surface 26, so that the diffraction in the direction corresponding to main scanning is the Fraunhofer's diffraction and, therefore, has little influence on the intensity distribution of the beam spot. As FIG. 2C indicates, the polygonal mirror 18A differs from a conventional one in that it has anti-reflection zones 1B and a reflection zone 1A intervening between the anti-reflection zones 1B and having a predetermined width. To form the anti-reflection zones 1B, a conventional polygonal mirror may be painted black at opposite edges of the reflective surfaces with respect to the axis of rotation thereof. The optical arrangement from the laser 10 to the target surface 26 appears as shown in FIG. 2B when drawn along the developed optical path such that the direction corresponding to subscanning is the vertical direction. The light beam passed through the aperture of the aperture member 14 is transmitted through the cylindrical lens 16 to reach a reflective surface 19A of the polygonal mirror 18A while being slightly converged in the direction corresponding to subscanning. The reflective surface 19A of the mirror 18A has the width b' in the axial direction of the mirror 18A, i.e., in the direction corresponding to subscanning. Hence, the width of the deflected light beam in the direction corresponding to subscanning is limited to the width b', as measured on the reflective surface 19A.

Figure 2C:
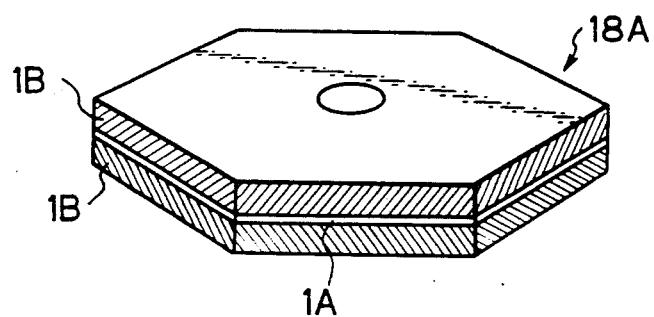
FIG. 2C shows a rotary polygonal mirror also playing the role of aperture means.
Figure 2D:
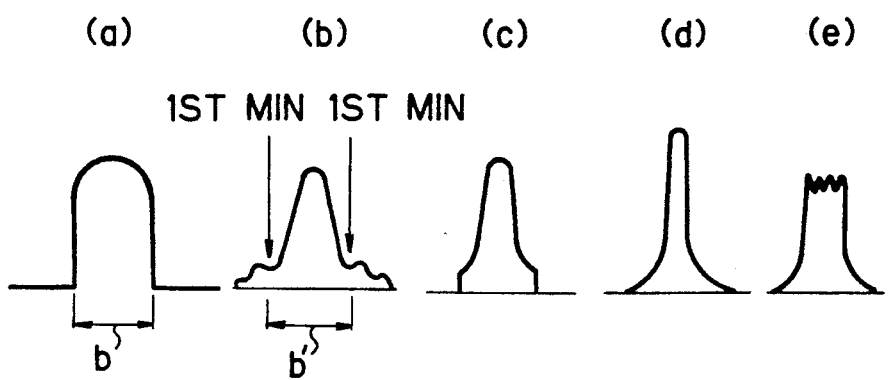
FIG. 2D plots optical intensity distributions measured at a given position on a developed optical path.

In FIG. 2D, (a) indicates the optical intensity distribution of the light beam which has just passed the aperture member 14, as plotted in the direction corresponding to subscanning. The width of the light beam is regulated by the aperture width b of the aperture member 14. An intensity distribution (b), FIG. 2D, is associated with the light beam incident to the reflective surface 19A, as also plotted in the direction corresponding to subscanning. The intensity distribution (b) has a bell-like great peak at the center thereof and small consecutive peaks at both sides of the great peak. The distance between the first minimums of the distribution (b) is the distance b', and the width of the reflective surface 19A in the axial direction is equal to the distance b'. As a result, the light beam having just been reflected by the reflective surface 19 has lost the light lying outside of the first minimums and has a simple intensity distribution (c), FIG. 2D, in the direction corresponding to subscanning. When such a light beam is focused onto the target surface 26 by the lenses 20 and 24, it has a desirable intensity distribution (d), FIG. 2D, resembling the Gaussian distribution. Consequently, a desirable intensity distribution is set up on the target surface 26 in both of the main scanning and subscanning directions. This is successful in rendering tones in a reproduced image, as stated earlier. Should a conventional polygonal mirror whose reflective surface 19A is not limited in width be used, the beam spot on the target surface 26 would have an irregular intensity distribution (e), FIG. 2D, and, therefore, would fail to record an image in high density or to render tones.

Figure 3A:
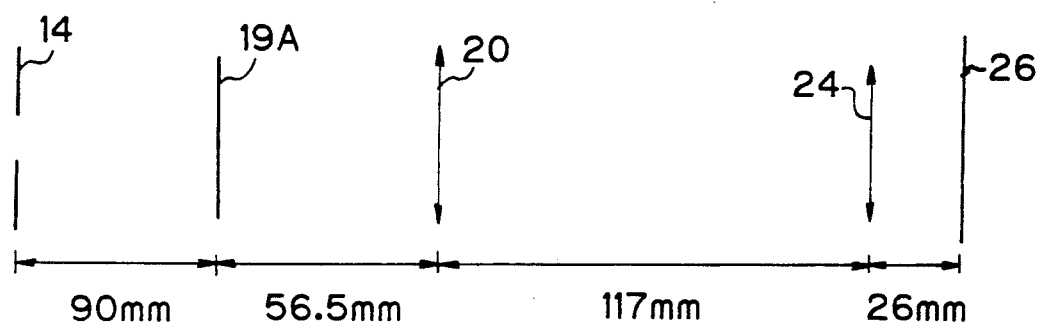
FIG. 3A shows an optical arrangement particular to the embodiment of FIGS. 2A-2D.

A reference will be made to FIGS. 3A-4B for describing another alternative embodiment of the present invention. This embodiment is similar to the embodiment of FIGS. 2A and 2B except that it lacks the cylindrical lens 16. In the figures, the same components are designated by the same reference numerals, and redundant description will be avoided for simplicity. The laser 10 emits a laser beam whose wavelength is 780 nanometers. Such a laser beam is transformed to a parallel beam which is 2 millimeters in diameter in terms of $1/e^2$ in the direction corresponding to subscanning by the collimator lens 12. The collimated light beam is passed through the aperture member 14. The aperture width of the aperture member 14 in the direction corresponding to subscanning is selected to be 0.42 millimeter. As shown in FIG. 3A, the aperture member 14 and the reflective surface 19A of the polygonal mirror are spaced apart by 90 millimeters when the image height of the beam spot is zero. The f-theta lens 20 has a focal distance F of 143 millimeters. The front principle point of the lens 20 and the reflective surface 19A is spaced apart by 56.5 millimeters when the image height is zero. The anamorphic lens 24 has a focal distance f' of 26 millimeters and is spaced apart from the rear principle point of the lens 20 by 117 millimeters. The rear principle point of the lens 24 and the target surface 26 are located at a distance of 26 millimeters from each other.

Figure 3B:
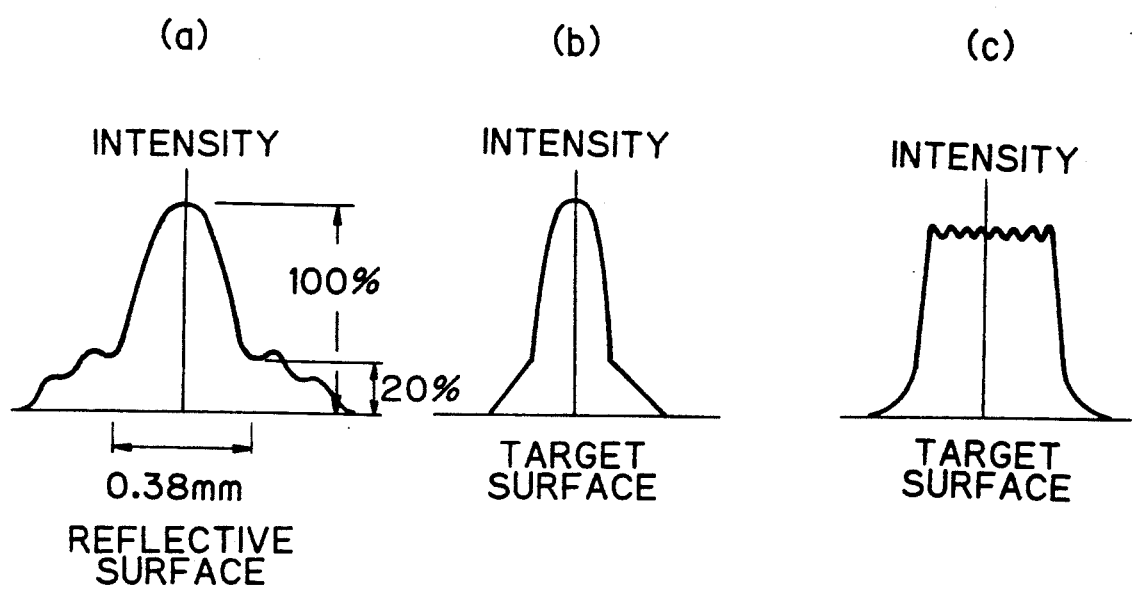
FIG. 3B plots optical intensity distributions.
Figure 3C:
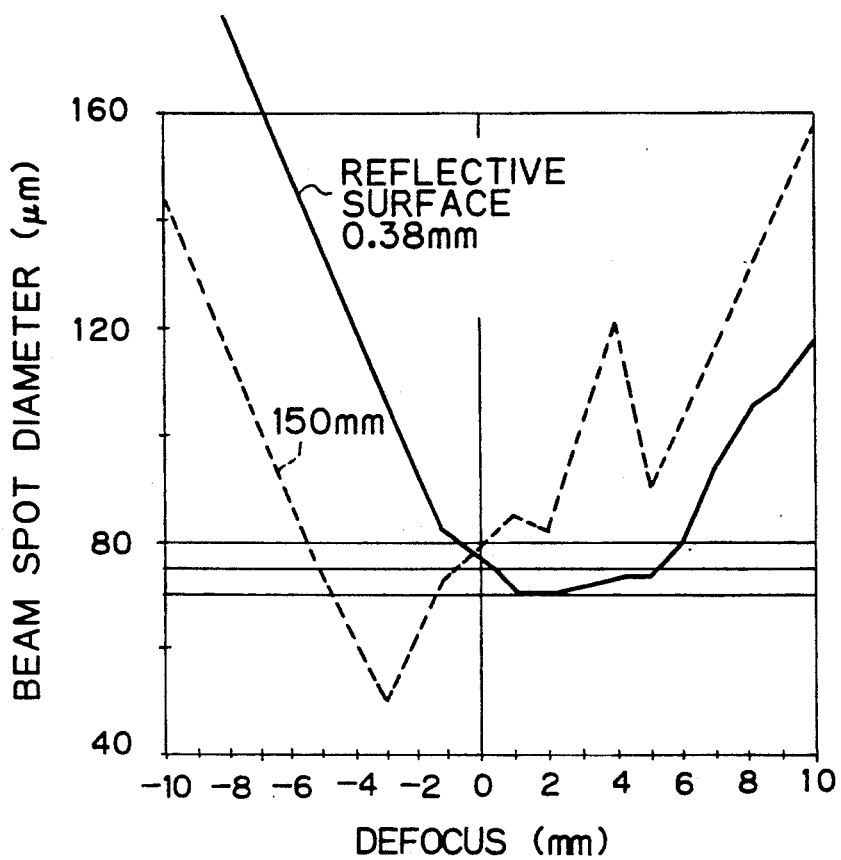
FIG. 3C plots the relationship between beam spot diameter and the defocusing distance for the embodiment shown in FIG. 3A where the image height is equal to zero.

The light beam on the reflective surface 19A has a distribution (a), FIG. 3B, in the direction corresponding to subscanning due to the influence of the diffraction by the aperture member 14. In the distribution (a), the distance between the first minimums is 0.38 millimeter. In light of this, the reflective surface 19A is configured to have a width of 0.38 millimeter in the axial direction. On the target surface 26, a simple bell-like intensity distribution (b), FIG. 3B, is set up which is similar to the Gaussian distribution, when the image height and depth of the beam spot are zero. Since the intensity distribution (a) on the reflective surface 19A in the direction corresponding to subscanning has an intensity which is 20 percent of the peak intensity, the intensity distribution (b) of the beam spot on the target surface 26 is slightly flared by being slightly influenced by the diffraction ascribable to the width of the reflective surface 19A. Nevertheless, this distribution generally has a simple bell-like configuration which implements high-density recording and tone rendering. When the reflective surface 19A is increased in width to 2.5 millimeters, for example, the intensity distribution will be noticeably influenced by the diffraction particular to the aperture member 14, as indicated by (c) in FIG. 3B. FIG. 3C shows curves representative of the depths in the subscanning direction in terms of $1/e^2$ which were determined with the widths of 0.38 millimeters and 2.5 millimeters. It is to be noted that when the image surface has a curvature, the curves shown in FIG. 3C will be shifted in the direction of depth substantially by the curvature of the image surface in association with the image height. As FIG. 3C indicates, the beam spot available with this embodiment has a stable diameter.

Figure 4A:
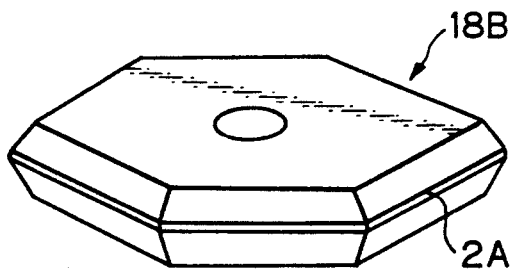
FIGS. 4A and 4B each shows another specific configuration of the polygonal mirror bifunctioning as aperture means.
Figure 4B:
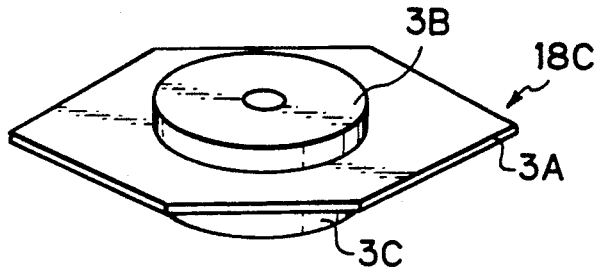

In this embodiment, the polygonal mirror may have a configuration shown in FIG. 4A or 4B specifically, in place of the configuration of FIG. 2C. In FIG. 4C, a polygonal mirror 18B has opposite edges of each narrow reflective surface 2A chamfered to define the width of the reflective zone. In FIG. 4B, a polygonal mirror 18C is shown whose substantial portion is configured to the thickness of the reflective surface 3A. In this case, pressing members 3B and 3C hold and reinforce the substantial portion of the mirror 18C to prevent it from being deformed during rotation. Of course, the pressing members 3B and 3C can be omitted if the substantial portion is made of a mechanically strong material.

Figure 5A:
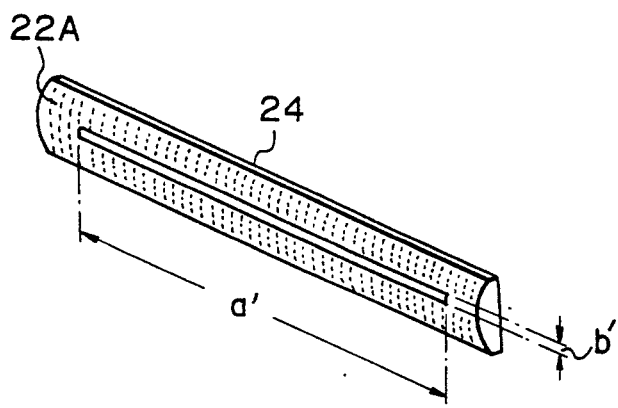
FIG. 5A shows an elongate anamorphic lens which is representative of another alternative embodiment of the present invention and also plays the role of aperture means.
Figure 5B:
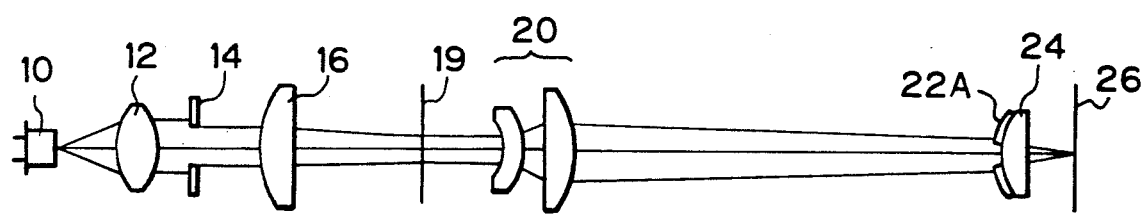
FIG. 5B shows an optical arrangement along the developed optical path.

Referring to FIGS. 5A and 5B, another alternative embodiment of the present invention is shown. In these figures, the component essentially similar to those shown in FIGS. 1A through 1E are designated by the same reference numerals for simplicity. This embodiment lacks the slit plate 22, FIG. 1A, and has a screening layer 22A provided on the entrance surface of the anamorphic lens 24, FIG. 1A. The screening layer 22A has an elongate slit which extends in the direction corresponding to main scanning. The rest of the construction is identical with the arrangement shown in FIG. 1A. In this embodiment, therefore, the anamorphic lens 24 plays the role of aperture means also. As shown in FIG. 5A, to form the screening layer 22A, the entrance surface of the lens 24 is painted black or, alternatively, aluminum is deposited thereon by evaporation. The slit of the screening layer 22A has the length a' in the direction corresponding to main scanning and the width b' in the direction corresponding to subscanning. Of course, the length a' of the slit is determined in matching relation to the length of the main scanning range. The slit width b' is equal to the distance between the first minimums of the deflected light beam in the intensity distribution in the direction corresponding to subscanning, as measured on the entrance surface of lens 24. FIG. 5B shows the optical arrangement in such an orientation that the direction corresponding to subscanning is the vertical direction. Such an arrangement is identical with the arrangement shown in FIGS. 1A–1E except that the diffracted light is screened by the screening layer 22A instead of the slit plate 22.

This embodiment, like the previous embodiments, produces a beam spot having a desirable optical intensity distribution in both of the main scanning and subscanning directions, implementing high-density scanning and tone rendering. Since the focal point of the anamorphic lens 24 is substantially coincident with the target surface 26, the diffraction by the screening layer 22A is the Fraunhofer's diffraction on the target surface 26 and, therefore, has no critical influence on the intensity distribution of the beam spot. Should the aperture of the lens 24 be not restricted by the screening layer 22A, the beam spot on the target surface 26 would have an irregular intensity distribution similar to the distribution (e) of FIG. 1E, obstructing high-density recording and tone rendering.

Specifically, as shown in FIG. 5B, the laser 10 emits a laser beam having a wavelength of 780 nanometers, as in the previous embodiment. The collimator lens 12 transforms the laser beam to a parallel beam whose diameter in the subscanning direction is 2 millimeters in terms of $1/e^2$. The collimated light beam passes the aperture member 14. In this particular embodiment, the aperture member 14 is formed on the entrance surface of the cylindrical lens 16. The aperture member 14 has an aperture width of 0.42 millimeter in the direction corresponding to subscanning. The cylindrical lens 16 has a focal distance f of 178 millimeters and is so designed as to form a beam spot having a diameter of 0.07–0.08 millimeter in the subscanning direction.

Figure 6A:
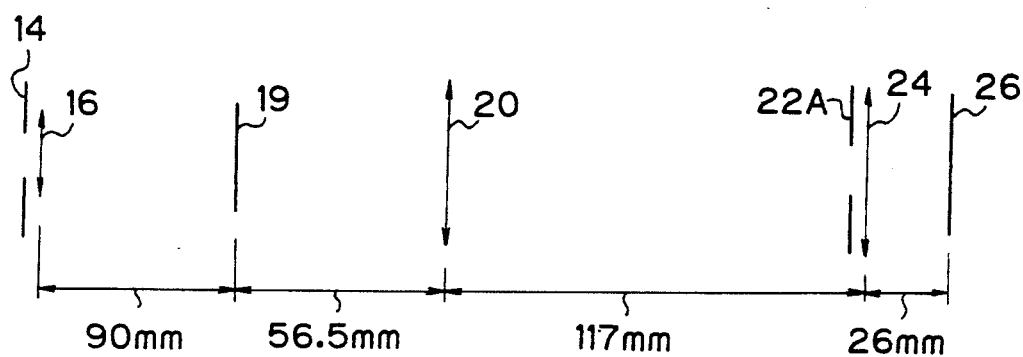
FIGS. 6A-6C show the embodiment of FIGS. 5A and 5B more specifically.
Figure 6B:
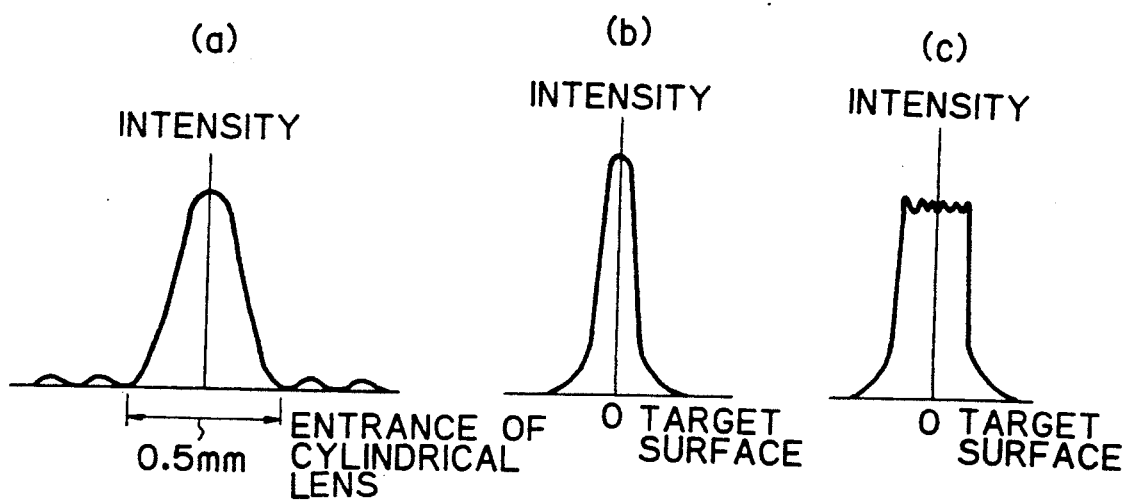
Figure 6C:
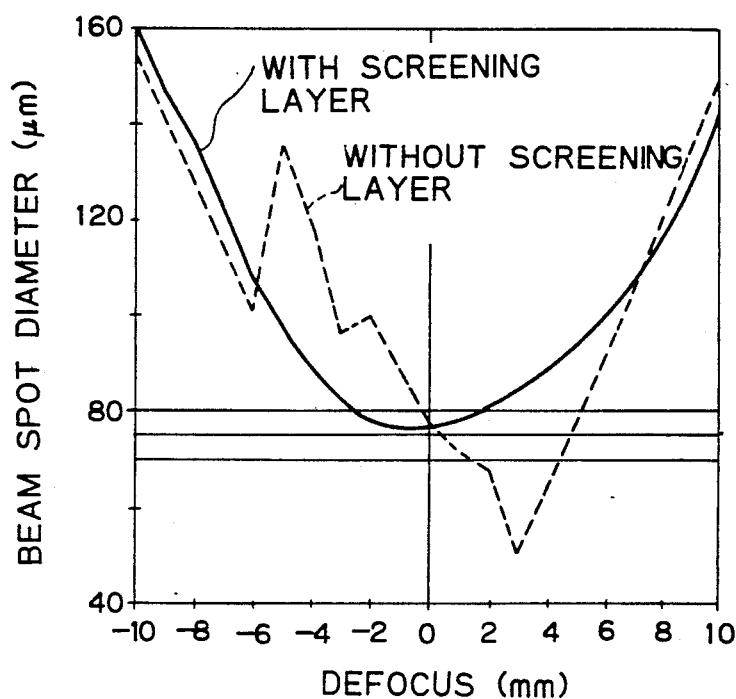

As shown in FIG. 6A, the cylindrical lens 16 and the reflective surface 19 of the polygonal mirror are spaced apart by 90 millimeters when the image height of the beam spot is zero. The f-theta lens 20 has a focal distance F of 143 millimeters. The distance between the front principle point of the lens 20 and the reflective surface 19 is 56.5 millimeters when the image height is zero. The anamorphic lens 24 has a focal distance f' of 26 millimeters and is spaced apart from the rear principle point of the f-theta lens 20 by 117 millimeters. The rear principle point of the lens 24 is spaced apart from the target surface 26 by 26 millimeters. The slit width b' of the screening layer 22A formed on the entrance surface of the anamorphic lens 24 is 0.5 millimeter. The slit width b' is equal to the distance between the first minimums of an intensity distribution (a), FIG. 6B, of the laser beam in the direction corresponding to subscanning, as measured on the entrance surface of the lens 24. When the image height and depth are zero, the beam spot formed on the target surface 26 has an intensity distribution (b), FIG. 6B, which is a smooth Gaussian distribution. If the screening layer 22A is not used, an intensity distribution (c), FIG. 6B, will be produced due to the influence of the diffraction by the aperture member 14. FIG. 6C shows depth curves in the subscanning direction. As FIG. 6C indicates, when the image surface has a curvature, the depth curve is sifted in the direction of depth substantially by the curvature of the image surface in associated with the image height. Nevertheless, the diameter of the beam spot remains stable owing to the particular aperture of the anamorphic lens 24.

Figure 7A:
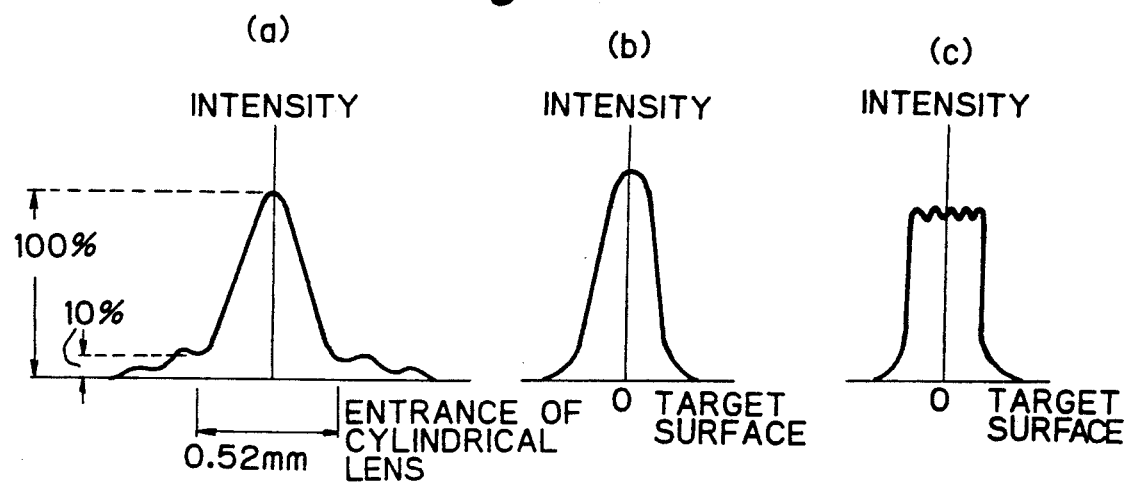
FIGS. 7A and 7B show another alternative embodiment of the present invention.
Figure 7B:
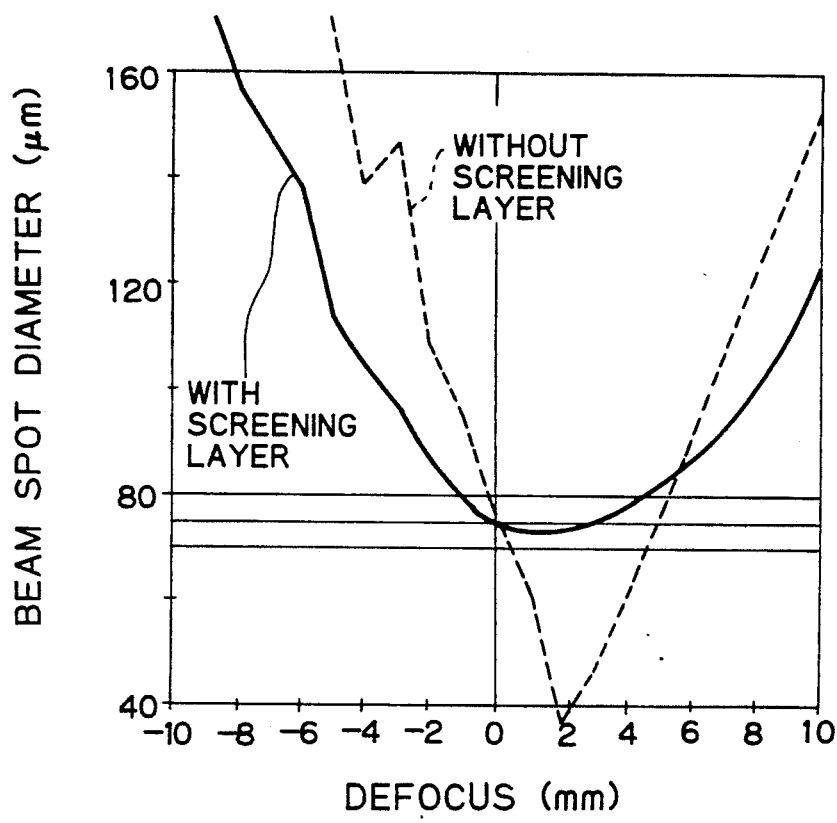

Another alternative embodiment of the present invention is as follows. In this embodiment, the cylindrical lens 16 included in the embodiment just described has a focal distance of 100 millimeters. Then, an optical intensity distribution (a) shown in FIG. 7A is set up in the direction corresponding to subscanning in the position where the screening layer 22A is located (entrance surface of the anamorphic lens 24). The distance between the first minimums is 0.52 millimeter, and therefore the slit width b' of the screening layer 22A in the direction corresponding to subscanning is also selected to be 0.52 millimeter. The first minimum of the intensity distribution in the direction corresponding to subscanning as measured at the position where the screening layer 22A screens out light is about 10 percent on the assumption that the peak value is 100 percent. Nevertheless, the beam spot has a smooth Gaussian intensity distribution (b), FIG. 7A, in the direction corresponding to subscanning on the target surface 26 when the image height and depth are zero. FIG. 7B shows depth curves each being determined in the subscanning direction in terms of $1/e^2$ with or without the screening layer 22A. As FIG. 7B indicates, the intensity distribution is not disturbed by the slit of the screening layer 22A at all, insuring a stable diameter-depth curve and a stable beam spot configuration. When the screening layer 22A is not used, an irregular intensity distribution (c), FIG. 7A, is observed in the subscanning direction. Again, the depth curves shown in FIG. 7B will be shifted in the previously stated manner when the image surface has a curvature.

While the screening layer 22A has been shown and described as being formed on the entrance surface of the anamorphic lens 24, it may be provided on another lens which is closer to the light source than the lens 24 and has power in the direction corresponding to subscanning, e.g. the f-theta lens and on the surface of such a lens which faces the lens 24.

Figure 8:
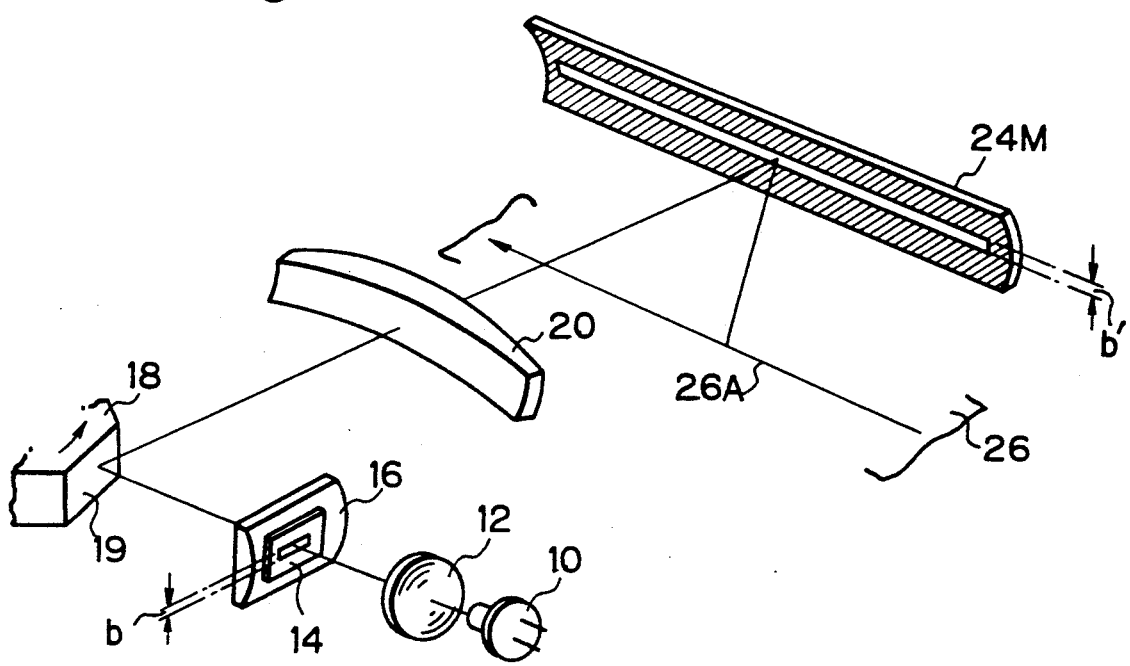
FIG. 8 shows another alternative embodiment of the present invention.

Referring to FIG. 8, another alternative embodiment of the present invention will be described. Although this embodiment is somewhat different in layout from the embodiment of FIG. 1A, the former is essentially similar to the latter except that the combination of slit plate 22 and anamorphic lens 24 is replaced with an elongate mirror 24M. In the figures, the same components are designated by the same reference numerals, and redundant description will be avoided for simplicity. While the f-theta lens 20 is represented by a single lens, it in practice may be made up of a plurality of lenses as in the embodiment shown in FIG. 1A. The elongate mirror 24M is implemented as a concave cylindrical mirror and also plays the role of aperture means. Such a mirror 24M is so positioned as to condense the deflected light beam substantially to the target surface 26 in the direction corresponding to subscanning. The substantially parallel laser beam issuing from the light source device, i.e., the laser 10 and collimator lens 12, is passed through the aperture of the aperture member 14, condensed by the cylindrical lens 16 in the direction corresponding to subscanning to be incident to the reflective surface 19 of the polygonal mirror 18, reflected by this mirror 18 to be incident to the f-theta lens 20, and then reflected by the elongate mirror 24M to form a beam spot on the target surface 26. As the polygonal mirror 18 is rotated, the light beam deflected thereby scans the target surface 26 along a scanning line 26A as a beam spot. The scanning line 26A is representative of the main scanning direction. At the position where the target surface 26 is located, a photoconductive element in the form of a drum, for example, is positioned such that the axis thereof coincides with the scanning line 26A. This is also true with the previous embodiments. Again, the aperture member 14 has an elongate rectangular aperture whose width is b in the direction corresponding to subscanning, limiting the diameter of the laser beam mainly in the direction corresponding to subscanning. The cylindrical concave mirror 24M is located in close proximity to the target surface 26 in such a manner as to extend in the direction corresponding to main scanning. As shown in FIG. 8, the mirror 24M is painted black or otherwise treated for nonreflection except for a slit-like reflective zone whose width is b'. The parallel laser beam issuing from the light source device is routed through the cylindrical lens 16, f-theta lens 20 and elongate mirror 24M to form a beam spot on the target surface 26.

In each of the embodiments described so far, it is only the f-theta lens 20 that has power in the direction corresponding to main scanning. Hence, regarding the main scanning direction, the infinite point on the light source side and the target surface 26 are optogeometrically conjugate with each other. It follows that the aperture member 14 is located at an infinite point on the light source side as seen from the target surface 26. Consequently, the diffraction by the aperture member 14 is the Fraunhofer's diffraction in the direction corresponding to main scanning and has little influence on the beam spot configuration and intensity distribution. This provides the beam spot with an intensity distribution which is a clear Gaussian distribution in the direction corresponding to main scanning. Regarding the direction corresponding to subscanning, the focal point of the elongate mirror 24M on the image side is substantially coincident with the target surface. This is successful in compensating for the irregularities in the configuration of the polygonal mirror 18. The focal point of the cylindrical lens 16 is deviated from the deflecting surface such that the beam spot on the target surface 26 has a diameter of about 0.05–0.15 millimeter in the subscanning direction, as in the previous embodiments. In such a configuration, the aperture member 14 is located at a finite distance in the direction corresponding to subscanning as seen from the target surface 26 and, therefore, the diffraction thereof is not negligible. The elongate mirror 24M successfully eliminates the influence of such a diffraction ascribable to the aperture member 14.

Figure 9A:
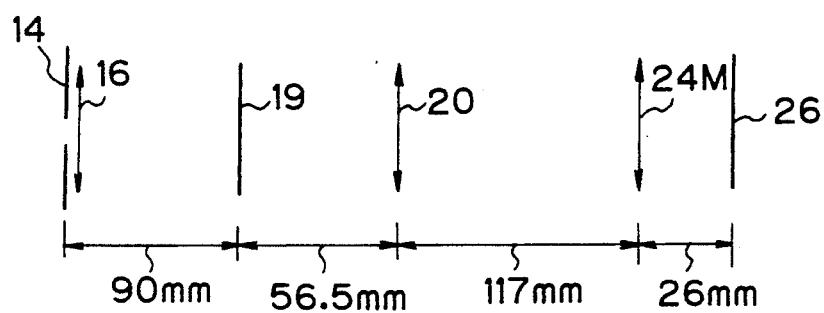
FIGS. 9A-9C show the embodiment of FIG. 8 more specifically.

This embodiment will be described more specifically with reference to FIGS. 9A–9C. As shown in FIG. 9A, the aperture member 14 is held in contact with the entrance surface of the cylindrical lens 16. The parallel light beam from the light source device (having a wavelength of 780 nanometers) has a diameter of 2 millimeters in terms of $1/e^2$. The aperture of the aperture member 14 has a width of 0.42 millimeter in the direction corresponding to subscanning. The light beam incident to the aperture member 14 has a Gaussian intensity distribution (a) as indicated by a dashed line in FIG. 9B. On passing the aperture of the aperture member 14, such a light beam has a width of 0.42 millimeter in the direction corresponding to subscanning, as also indicated in (a) of FIG. 9B. The cylindrical lens 16 has a focal distance of 178 millimeters. The distance between the reflective surface 19 of the polygonal mirror 18 and the cylindrical lens 16 is 90 millimeters when the deflected light beam scans the position where the image height is zero. The reflective surface 19 and the front principle point of the f-theta lens 20 are spaced apart by 56.5 millimeters while the rear principle point of the lens 20 and the elongate mirror 24M are spaced apart by a distance of 117 millimeters. The focal distance of the f-theta lens 20 is 143 millimeters. The elongate mirror 24M has a focal distance of 26 millimeters and is spaced apart from the target surface 26 by 26 millimeters along the optical path.

Figure 9B:
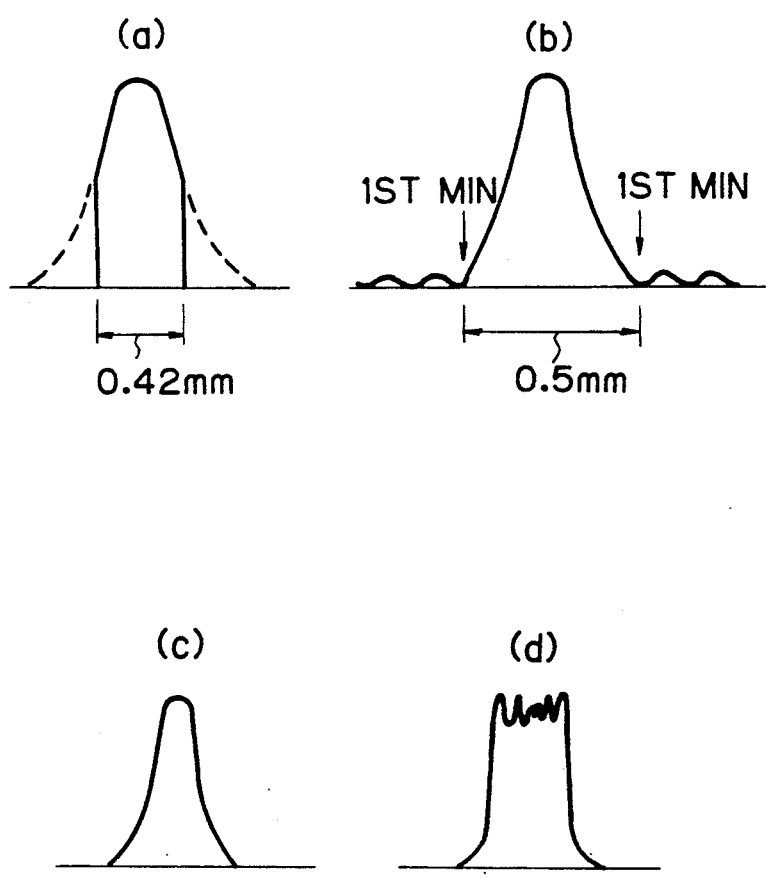

In the above optical arrangement, the deflected light beam on the mirror surface of the elongate mirror 24M has an intensity distribution (b) shown in FIG. 9B due to the influence of the diffraction by the aperture member 14. The intensity distribution (b) has a bell-like great peak at the center and successive small peaks at both sides of the great peak. In such a distribution, the distance between the first minimums is 0.5 millimeter. Therefore, the width b' of the mirror surface of the elongate mirror 24M is also selected to be 0.5 millimeter. As a result, the diffracted light beam loses the above-mentioned successive small peaks before it reaches the target surface 26. In the above arrangement, the beam spot on the target surface 26 has a diameter of 0.07-0.8 millimeter in terms of $1/e^2$. However, if the diffracted part of the light beam is not removed by the elongate mirror 24M, the beam spot will have a complicated intensity distribution (d), FIG. 9B, in the subscanning direction. Such a distribution (d) prevents tones from being rendered. When the diffracted part is intercepted by the mirror 24M, the beam spot achieves a smooth Gaussian intensity distribution (c), FIG. 9B, also in the subscanning direction. This insures high-density scanning and tone rendering.

Figure 9C:
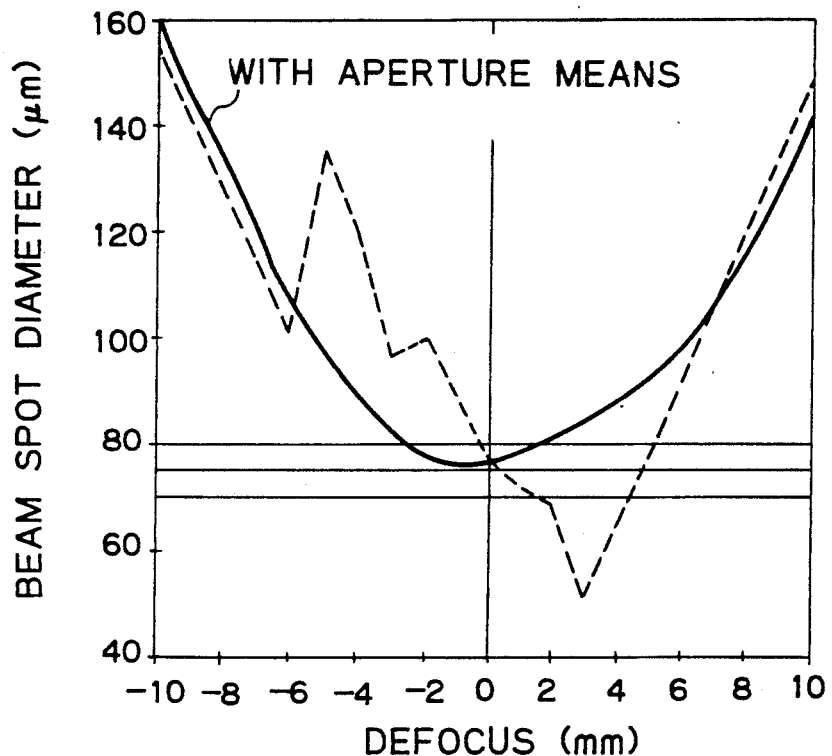

FIG. 9C shows a relation between the diameter of the beam spot ($1/e^2$) at the position where the image height is zero and the amount of defocus, as measured in the subscanning direction. When the diffracted part of the light beam is not screened out, the beam spot noticeably changes in diameter even in the vicinity of the focusing point, as indicated by a dashed curve in FIG. 9C. By contrast, when the diffracted part is screened out, the change in the beam spot diameter in the vicinity of the focusing point is effectively reduced, as indicated by a solid curve in FIG. 9C. This embodiment fully eliminates the diffracted part of the light beam since the optical intensity at the first minimum of the intensity distribution in the direction corresponding to subscanning is zero as measured at the position where the mirror surface of the mirror 24M is located.

Figure 10A:
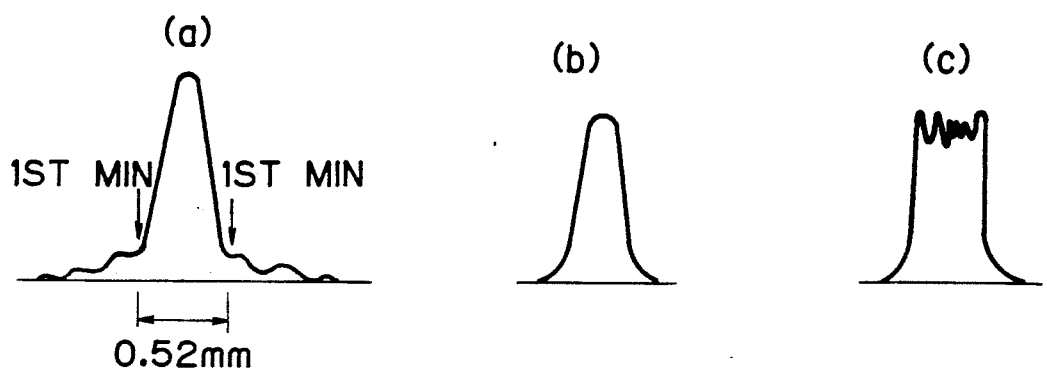
FIGS. 10A and 10B show another alternative embodiment of the present invention.
Figure 10B:
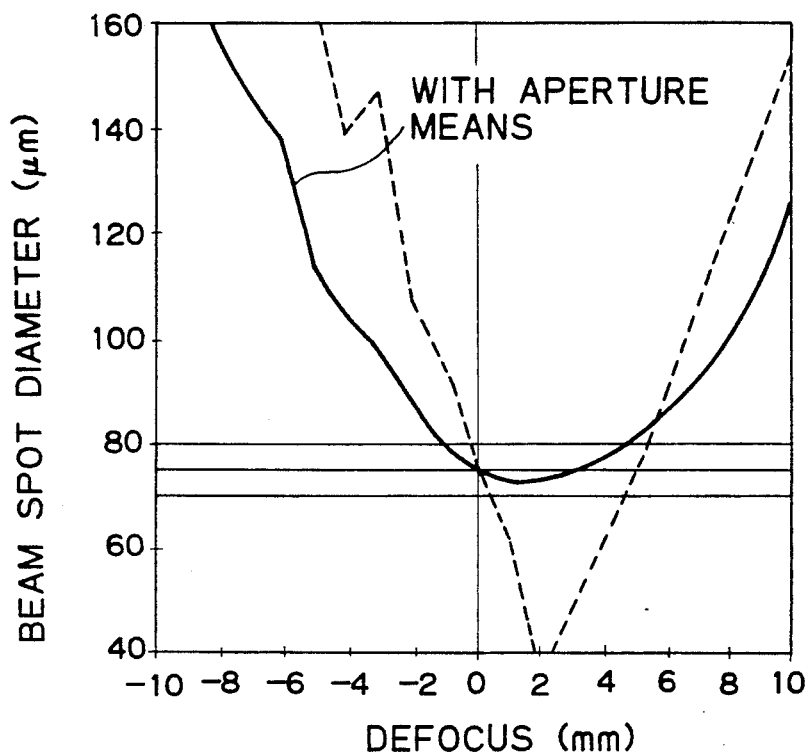

Assuming that the focal distance of the cylindrical lens 16 included in the optical arrangement of FIG. 9A is 100 millimeters, an intensity distribution (a) shown in FIG. 10A is set up in the direction corresponding to subscanning on the mirror surface of the elongate mirror 24M. The distribution (a) has an intensity which is about 10 percent of the peak value even at the first minimums. The distance between the first minimums is 0.52 millimeter. When the mirror surface of the mirror 24M has a width of 0.52 millimeter for removing the part of the light beam lying outside of the first minimums, a smooth and clear intensity distribution (b), FIG. 10A, is achievable. Further, a desirable depth characteristic is attainable when the image height is zero, as indicated by a solid curve in FIG. 10B. Should the diffracted part be not removed, a complicated intensity distribution (c), FIG. 10A, would appear while, as indicated by a dashed line in FIG. 10B, the beam spot diameter would noticeably change in the vicinity of the focusing point.

Figure 11:
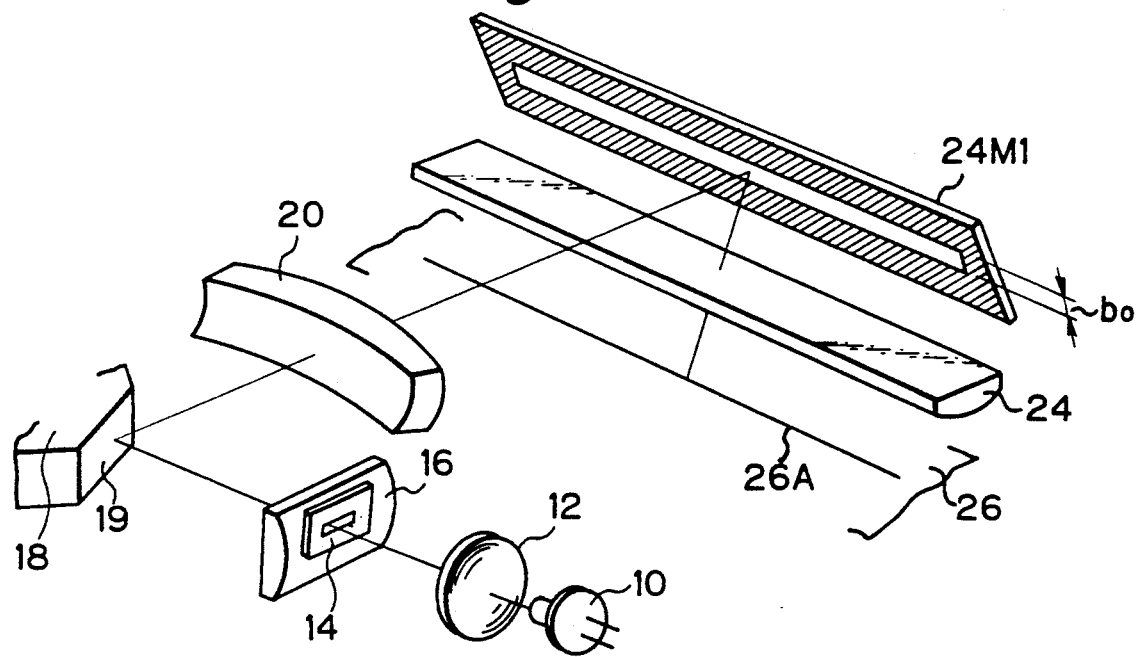
FIG. 11 shows another alternative embodiment of the present invention.
Figure 13A:
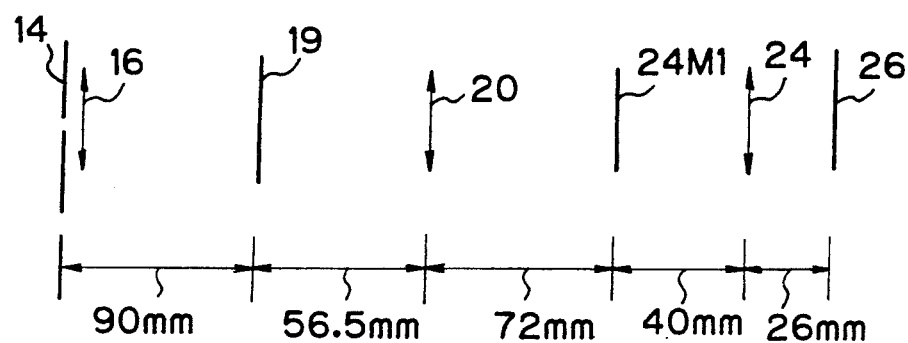
FIGS. 13A-13C show another alternative embodiment of the present invention.
Figure 13B:
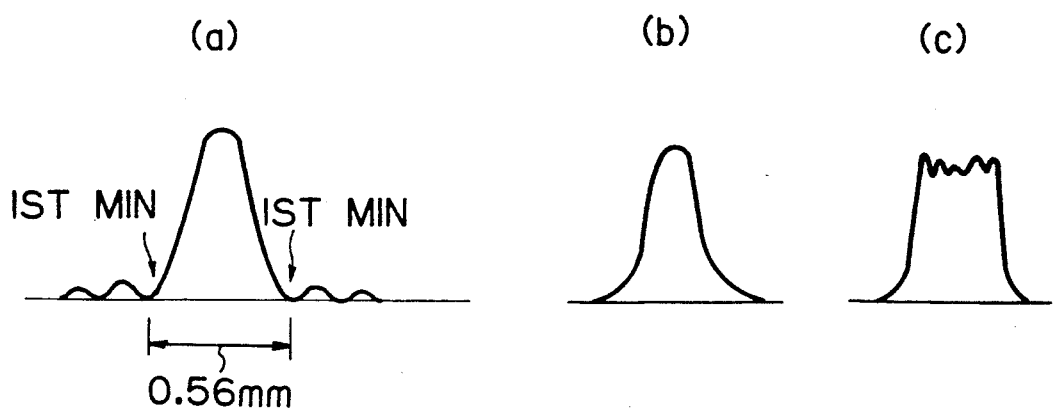
Figure 13C:
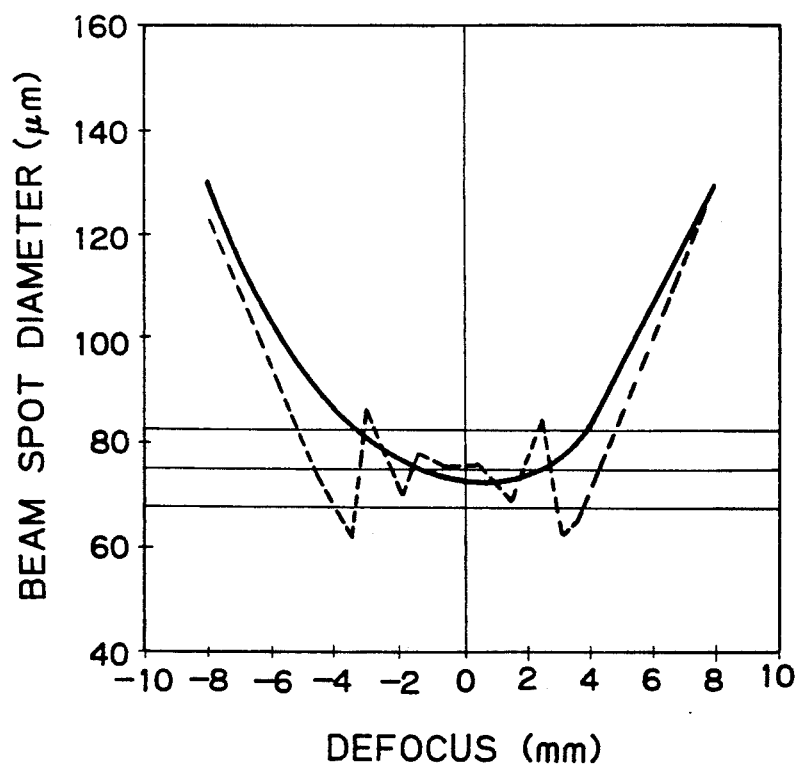

FIG. 11 shows another alternative embodiment of the present invention which is similar to the embodiment of FIG. 8 except that it has an elongate mirror 24M1 and the anamorphic lens 24 on the optical path extending between the f-theta lens 20 and the target surface 26. The rest of the construction is identical with the embodiment of FIG. 8. In the figures, the same components are designated by the same reference numerals, and redundant description will be avoided for simplicity. The elongate mirror 24M1 plays the role of the slit plate 22 which is included in the optical arrangement of FIG. 1A. The mirror surface of the mirror 24M1 is flat and has a reflecting width of $b_o$, i.e., the portion indicating by hatching in the figure is treated for non-reflection. FIG. 13A shows an optical arrangement particular to this embodiment. The arrangement from the aperture member 14 to the f-theta lens 20 is the same as in the embodiment of FIG. 9A. Namely, the aperture of the aperture member 14 has a width of 0.42 millimeter in the direction corresponding to subscanning, the parallel light beam incident to the aperture member 14 has a diameter of 2 millimeters in terms of $1/e^2$, the cylindrical lens 16 has a focal distance of 178 millimeters, and the f-theta lens 20 has a focal distance of 143 millimeters. The distance between the rear principle point of the f-theta lens 20 and the mirror 24M1 is 77 millimeters while the distance between the mirror 24M1 and the anamorphic lens 24 is 40 millimeters. The rear principle point of the lens 24 and the target surface 26 are spaced apart by 26 millimeters which is equal to the focal distance of the lens 24. At the position where the mirror 24M1 is located, the deflected light beam has an intensity distribution (a), FIG. 13B, in the direction corresponding to subscanning. In this distribution (a), the distance between the first minimums is 0.56 millimeter. When the reflecting width $b_o$ of the mirror 24M1 is selected to be 0.56 millimeter, the beam spot on the target surface 26 has a clear Gaussian distribution (b), FIG. 13B, in both of the main scanning and subscanning directions. As indicated by a solid line in FIG. 13C, the depth characteristic at the image height of zero is also desirable, i.e., the diameter of the beam spot changes little in the vicinity of the focusing position. When the diffracted part of the light beam is not removed, a complicated intensity distribution (c), FIG. 13B, appears in the subscanning direction while, as indicated by a dashed line in FIG. 13C, the diameter of the beam spot is not stable in the vicinity of the focusing position.

Figure 12:
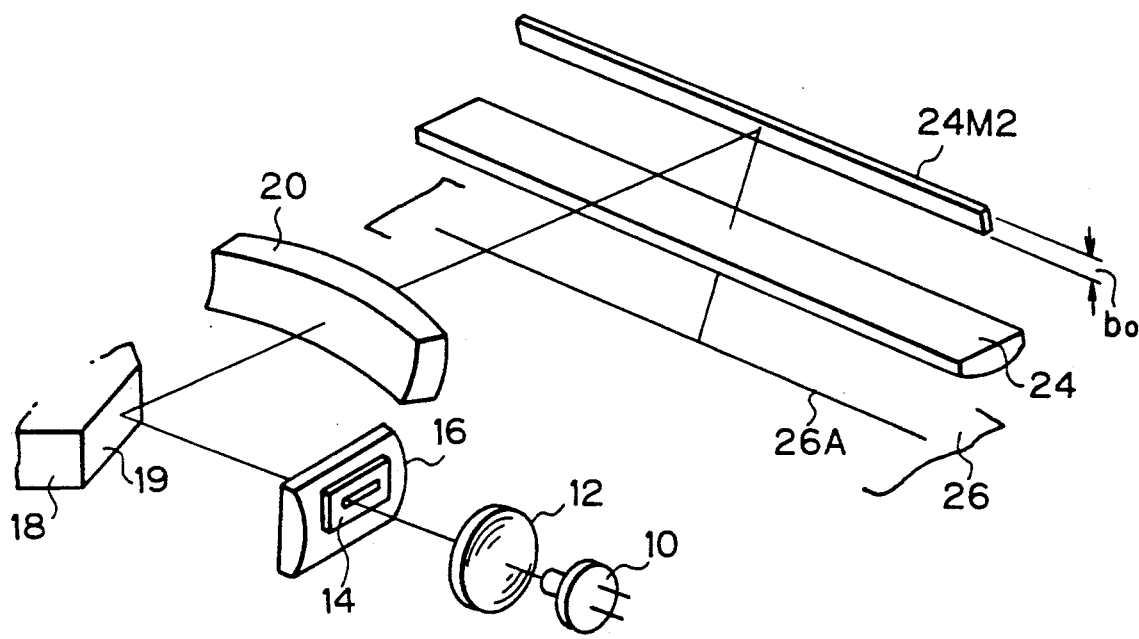
FIG. 12 shows a modification of the embodiment depicted in FIG. 11.

FIG. 12 shows a modification of the embodiment depicted in FIG. 11. In the figures, the same components are designated by the same reference numerals, and redundant description will be avoided for simplicity. The modification has an elongate flat mirror 24M2 having a small width $b_o$ in place of the elongate mirror 24M1 of FIG. 11. The rest of the construction and arrangement is the same as the embodiment described with reference to FIGS. 11 and 13A-13C. The mirror width or reflecting width $b_o$ of the mirror 24M2 is selected to be 0.56 millimeter. It will be readily seen that the modification shares the same intensity distribution and depth characteristic with the embodiment of FIG. 11. Of course, the mirror 24M shown in FIG. 8 may be replaced with an elongate cylindrical concave mirror whose mirror width is b'.

Figure 14A:
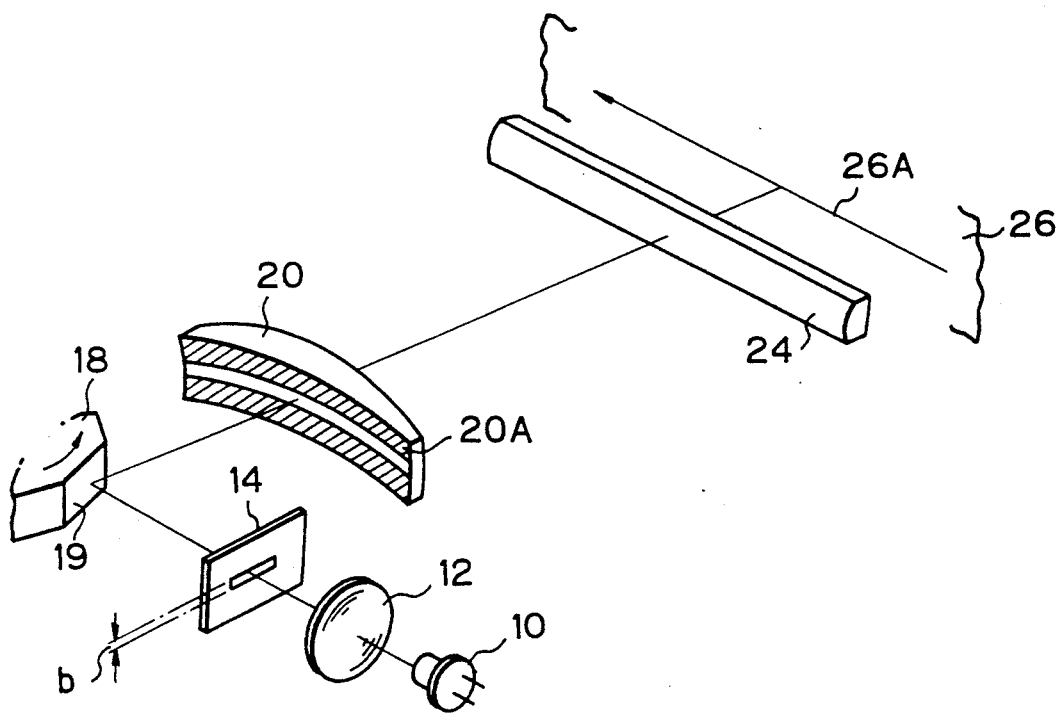
FIGS. 14A-14C show another alternative embodiment of the present invention.
Figure 14B:
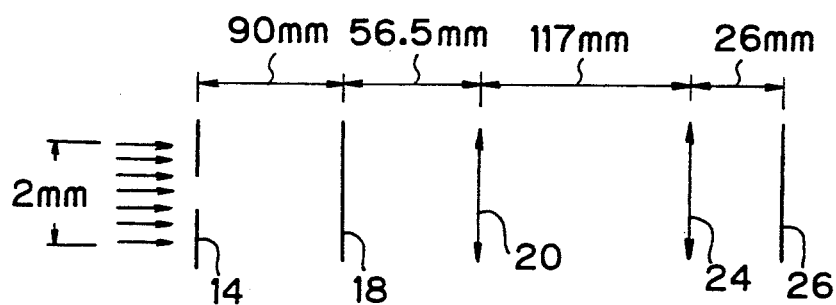
Figure 14C:
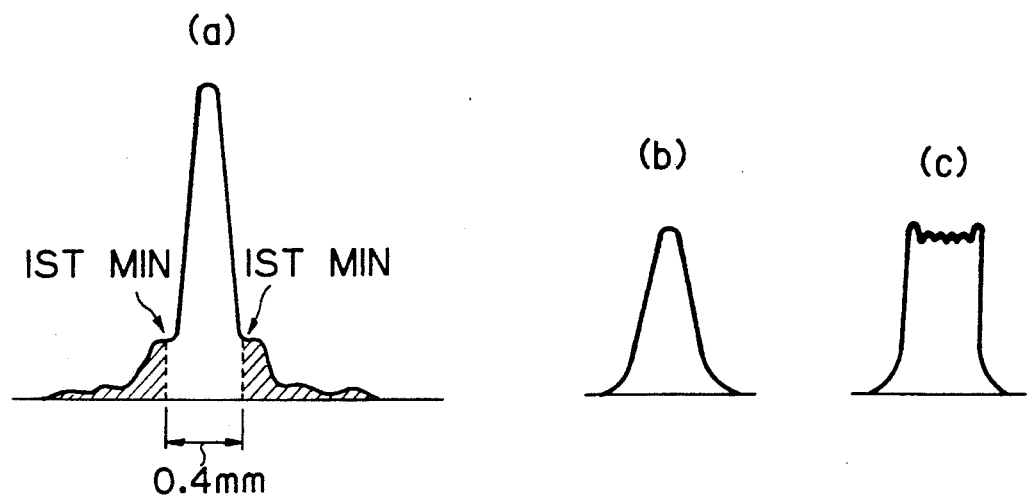

Referring to FIGS. 14A-14C, another alternative embodiment of the present invention will be described. In the figures, the same components are designated by the same reference numerals, and redundant description will be avoided for simplicity. As shown in FIG. 14A, the substantially parallel light from the light source device which is made up of the laser 10 and collimator lens 12 passes the aperture of the aperture member 14 to reach the reflective surface 19 of the polygonal mirror, or deflecting device, 18. The light beam reflected by the mirror 18 is focused by the f-theta lens 20 and anamorphic lens 24 to form a beam spot on the target surface 26. As the polygonal mirror 18 is rotated, the light beam deflected thereby scans the target surface 26 along the scanning line 26A as a beam spot. The aperture of the aperture member 14 is elongate in the direction corresponding to main scanning and has the width b in the direction corresponding to subscanning. With such a configuration, the aperture member 14 restricts the diameter of the incident light beam mainly in the direction corresponding to subscanning. The aperture member 14 may be implemented by a flat parallel sheet of glass and a thin aluminum film deposit on the glass sheet and having the above-stated elongate aperture. This is also true with all of the embodiments shown and described. Having positive power in the direction corresponding to subscanning, the anamorphic lens 24 is located in close proximity to the target surface 26 in such a manner as to extend in the direction corresponding to main scanning. The focal point of the lens 24 substantially coincides with the target surface 26. The parallel light beam from the light source device is focused by the f-theta lens 20 and anamorphic lens 24 to form a beam spot on the target surface 26.

Since it is the f-theta lens 20 that has power in the direction corresponding to main scanning and since the deflected light beam is parallel, the lenses 20 and 24 are held in an optogeometrically conjugate relation in the direction corresponding to main scanning. Hence, the aperture member 14 is located at an infinite point on the light source side as seen from the target surface 26. It follows that in the direction corresponding to main scanning the diffraction by the aperture member 14 is also the Fraunhofer's diffraction in this embodiment. Such a diffraction has little influence on the configuration of the beam spot and the optical intensity distribution, so that the beam spot has a clear Gaussian intensity distribution in the direction corresponding to main scanning. On the other hand, in the direction corresponding to subscanning, the focal point of the anamorphic lens 24 is substantially coincident with the target surface 26 to compensate for the irregularities in the configuration of the polygonal mirror 18. However, the influence of the diffraction by the aperture member 14 is not negligible since the aperture member 14 is located at a finite distance in the direction corresponding to subscanning as seen from the target surface 26.

In FIG. 14A, the f-theta lens 20 is represented by a single lens for simplicity. Alternatively, the f-theta lens 20 may be implemented by a plurality of lenses.

The embodiment shown in FIG. 14A will be described more specifically with reference to FIGS. 14B and 14C. As shown in FIG. 14B, the parallel light beam incident to the aperture member 14 (having a wavelength of 780 nanometers) has a diameter of 2 millimeters in terms of $1/e^2$. The aperture of the aperture member 14 has a width b of 0.48 millimeter in the direction corresponding to subscanning. Therefore, the light beam having passed through the aperture of the aperture member 14 is 0.48 millimeter wide in the direction corresponding to subscanning. The distance between the aperture member 14 and the reflective surface 19 of the polygonal mirror 18 is 90 millimeters when the light beam scans a position where the image height is zero. The reflective surface 19 and the front principle point of the f-theta lens 20 are spaced apart by 56.5 millimeters while the rear principle point of the lens 20 and the anamorphic lens 24 are spaced part by 117 millimeters. The focal distance of the f-theta lens 20 is 143 millimeters. The anamorphic lens 24 has a focal distance of 26 millimeters and is located at a distance of 26 millimeters from the target surface 26. Specifically, the f-theta lens 20 is made up of two lenses and has the first lens surface thereof covered with a screening layer 20A except for a slit-like aperture, as indicated by hatching in FIG. 14A. In this respect, the f-theta lens bifunctions as an aperture means. The deflected light beam incident to the first lens surface of the f-theta lens 20 has an intensity distribution (a) shown in FIG. 14C. The intensity distribution (a) has a bell-like great peak at the center and successive small peaks ascribable to the diffraction by the aperture member 14 at both sides of the great peak. Since the distance between the first minimums of the distribution (a) is 0.4 millimeter, the aperture defined by the screening layer 20A on the first lens surface is selected to be 0.4 millimeter. Therefore, the diffracted part of the light beam (indicated by hatching in the distribution (a), FIG. 14C) is intercepted before the light beam reaches the target surface 26.

Figure 15:
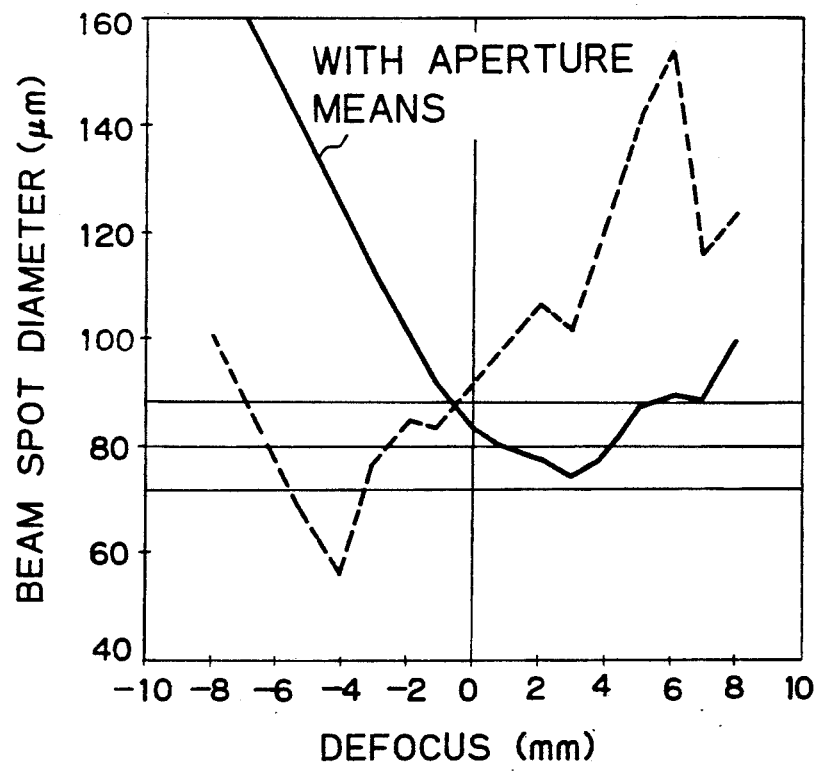
FIG. 15 plots a depth characteristic relating to the embodiment of FIGS. 14A-14C.

The diameter of the beam spot on the target surface 26 is selected to be 0.07-0.08 millimeter in terms of $1/e^2$, as in the previous embodiments. However, if the diffracted part of the light beam is not removed by the screening plate 20A provided on the lens surface of the f-theta lens 20, the beam spot will have an intensity distribution (c), FIG. 14C, which is too complicated to render tones. By contrast, when only the light beam passed through the aperture of the f-theta lens 20 forms a beam spot on the target surface 26, a smooth Gaussian intensity distribution (b), FIG. 14C, is achievable to enhance high-density recording and tone rendering. In the subscanning direction, the diameter of the beam spot has a depth characteristic shown in FIG. 15 when measured at the position where the image height is zero. When the diffracted part of the light beam is not screened out, the diameter of the beam spot noticeably changes in the vicinity of the focusing position, as indicated by a dashed curve in FIG. 15. When the diffracted part is screened out, the change in the diameter of the beam spot is effectively reduced, as indicated by a solid curve in FIG. 15.

Figure 16:
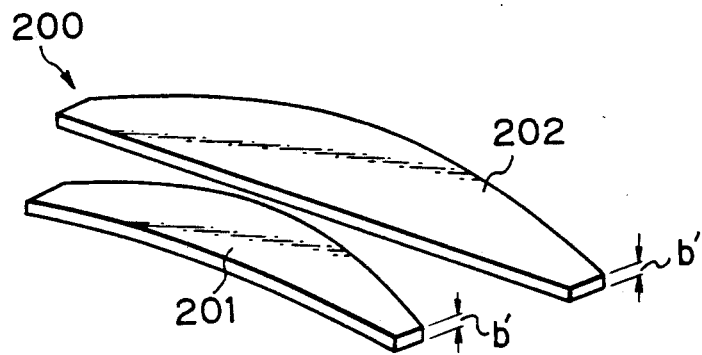
FIG. 16 is a fragmentary view of another alternative embodiment of the present invention.

Referring to FIG. 16, another alternative embodiment of the present invention is shown in a fragmentary view. In this embodiment, an f-theta lens 200 is arranged in the same manner as and has the same optical characteristic as the f-theta lens 20 shown in FIG. 14B. The difference is that two lenses 201 and 202 constituting the f-theta lens 200 each has a thickness b' in the direction corresponding to subscanning which is substantially equal to the distance (0.4 millimeter) between the first minimums of the intensity distribution of the deflected light beam, as measured on the surface of the lens 201 that faces the polygonal mirror in the above-mentioned direction. In such a configuration, the diffracted part of the deflected beam is not incident to the f-theta lens 200. Hence, the beam spot has the intensity distribution shown in FIG. 14C in the subscanning direction and the depth characteristic shown in FIG. 15. It is to be noted that the f-theta lens 200 may be provided with the screening layer on either one of the entrance and exit surfaces thereof and may have the aperture thereof restricted by more than two lenses. When the f-theta lens 200 is made up of a plurality of lenses as in the illustrative embodiment, only one of them may be used to restrict the aperture.

In the embodiments described above, the aperture means has a uniform screening width in the direction corresponding to main scanning. Although such a configuration is advantageous as discussed above, there is a fear that the elimination of the influence of diffraction fluctuates in association with the image height of the beam spot. Specifically, the portions of the light beam lying outside of the first minimums are derived from the diffraction by the aperture member and, if focused as a beam spot together with the portion lying between the minimums, would complicate the configuration and intensity distribution of the beam spot. To eliminate the influence of the diffraction on the beam spot, the aperture means described above may be used to remove the diffracted part of the light beam. However, the problem is that the diameter of the light beam lying between the first minimums in the direction corresponding to subscanning is not always constant in the plane perpendicular to the developed optical path and slightly changes depending on the image height. This stems from the fact that the front principle point, focal distance and rear principle point of the image forming optics located between the deflecting device and the target surface change with the image height when it comes to an actual deflected light beam. Hence, the attempt to screen the diffracted part of the light beam uniformly by, for example, a slit plate having a uniform slit width might result in excessive or short screening.

Figure 17A:
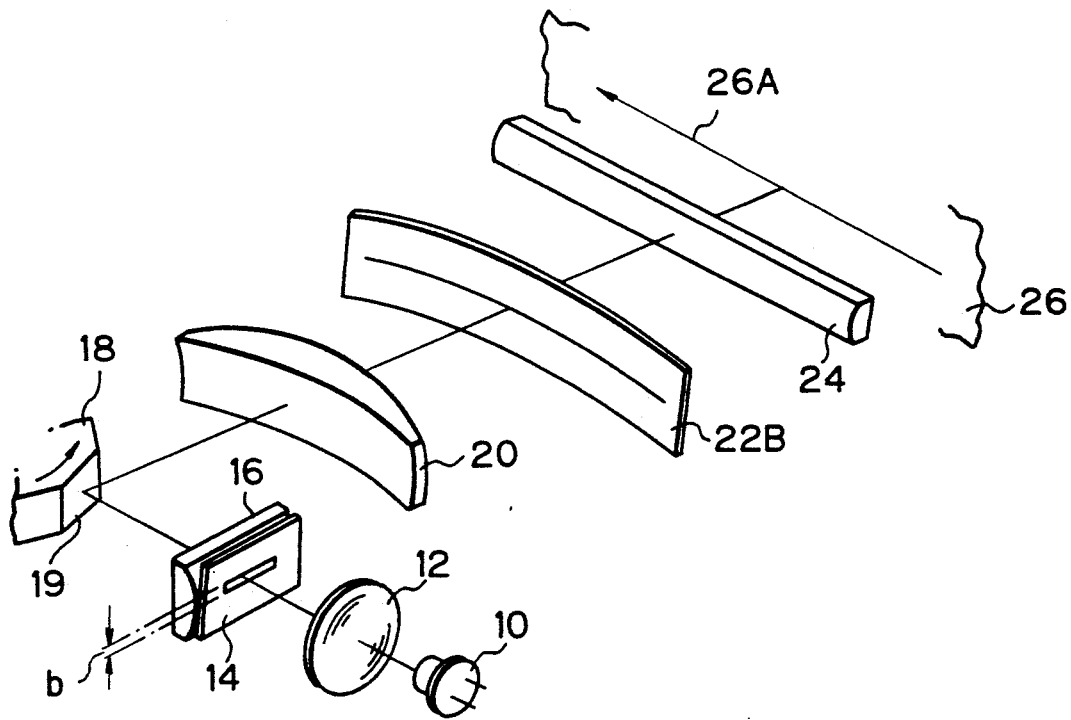
FIGS. 17A-17C show another alternative embodiment of the present invention.
Figure 17B:
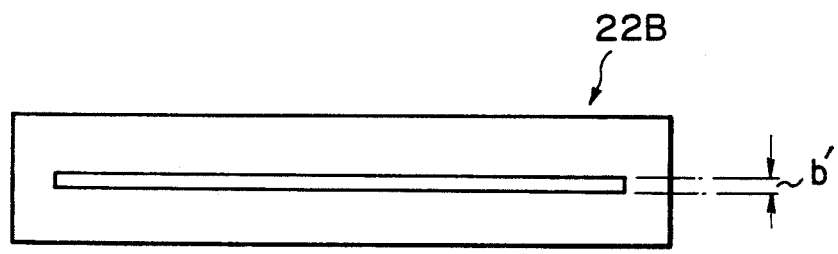
Figure 17C:
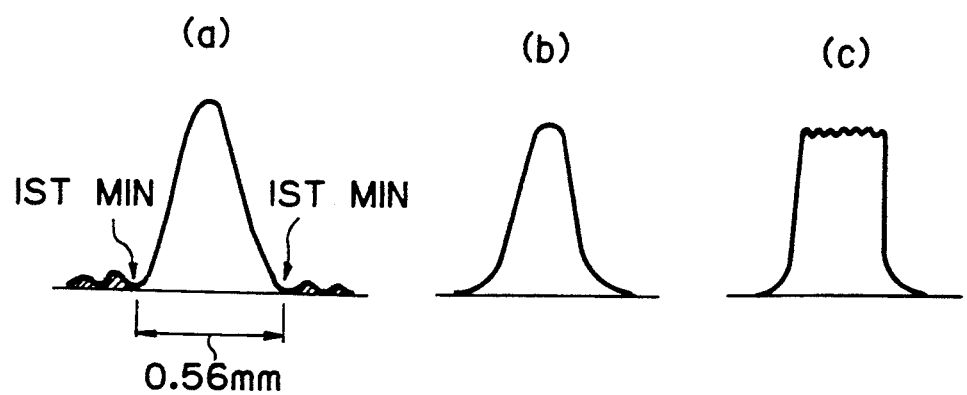

FIGS. 17A-17C illustrate another alternative embodiment of the present invention which eliminates the problem discussed above by curving a slit plate or changing the slit width along the length of a slit. An optical arrangement shown in FIG. 17A has a slit plate 22B which is similar to the slit plate 22 of FIG. 1A except that it is curved in the main scanning direction. The parallel light beam from the light source device, i.e., the laser 10 and colliminator lens 12 passed through the aperture of the aperture member 14 is incident to the reflective surface 19 of the polygonal mirror 18 while being converged in the direction corresponding to subscanning by the cylindrical lens 16. The light beam reflected by the reflective surface 19 is transmitted through the image forming optics, i.e., the f-theta lens 20 and anamorphic lens 24 to form a beam spot on the target surface 26. As the polygonal mirror 18 is rotated, the light beam is deflected with the result that the beam spot scans the target surface 26. As in the embodiments shown and described, the aperture member 14 has a rectangular aperture which is elongate in the direction corresponding to main scanning and has the width b in the direction corresponding to subscanning. Such an aperture restricts the diameter of the incident light beam mainly in the direction corresponding to subscanning. Again, the aperture member 14 is located at an infinite point on the light source side in the direction corresponding to main scanning as seen from the target surface 26. Hence, the diffraction by the aperture is the Fraunhofer's diffraction in the above-mentioned direction and has little influence on the configuration and intensity distribution of the beam spot. As a result, the beam spot has a clear Gaussian intensity distribution in the direction corresponding to main scanning. On the other hand, in the direction corresponding to subscanning, the anamorphic lens 24 forming part of the image forming optics has a focal point which is essentially coincident with the target surface 26, thereby compensating for the irregularities in the configuration of the polygonal mirror 18. The cylindrical lens 16 has the focal point thereof deviated from the position where the reflective surface 19 is located, so that the beam spot may have the desired diameter (0.05-0.15 millimeter) on the target surface 26 in the subscanning direction. Therefore, the aperture member 14 is situated at a finite distance from the target surface in the direction corresponding to subscanning, and the diffraction by the aperture member 14 is not negligible.

In FIG. 17A, while the f-theta lens 20 is represented by a single lens, it may of course be implemented as a combination of a plurality of lenses.

In detail, the parallel light beam (having a wavelength of 780 nanometers) incident to the aperture member 14 has a diameter of 2 millimeters in terms of $1/e^2$. The aperture of the aperture member 14 has a width b of 0.48 millimeter in the direction corresponding to subscanning. The light beam incident to the aperture member 14 with a Gaussian intensity distribution leaves the member 14 with a width of 0.48 millimeter in the direction corresponding to subscanning. The cylindrical lens 16 has a focal distance of 178 millimeters and is situated at the rear of and in contact with the aperture member 14. The distance between the aperture member 14 and the reflective surface 19 is 90 millimeters when the image height is zero, while the distance between the reflective surface 19 and the front principle point of the f-theta lens 20 is 56.5 millimeters. The f-theta lens 20 has a focal distance of 143 millimeters, and the distance between the principle point of the lens 20 and the front principle point of the anamorphic lens 24 is 117 millimeters. The anamorphic lens 24 has a focal distance of 26 millimeters and a focal point which is coincident with the target surface 26, as stated earlier. As shown in FIG. 17B, the slit plate 22B interposed between the f-theta lens 20 and the anamorphic lens 24 has an elongate slit having a uniform width b' and extending in the direction corresponding to main scanning. The slit plate 22B is curved, as shown in FIG. 17A. In the position shown in FIG. 17A, the center of the slit with respect to the lengthwise direction is located on the optical axis of the f-theta lens 20 while the slit plate 22B is spaced apart by 10 millimeters from the entrance surface of the anamorphic lens 24 toward the f-theta lens 20.

When image height of the beam spot is zero, the deflected light beam incident to the slit plate 22B has an optical intensity distribution (a) shown in FIG. 17C, as plotted in the direction corresponding to subscanning. The intensity distribution (a) has a bell-like great peak at the center and successive small peaks at both sides of the great peak. The small peaks indicated by hatching in the figure are representative of the part of the light beam which is diffracted by the aperture member 14 and should be removed. In the intensity distribution (a), FIG. 17C, the distance between the first minimums is 0.56 millimeter, so that the slit width b' of the sit plate 22B is also selected to be 0.56 millimeter.

While the slit plate 22B is located in a curved position as stated above, it will effectively eliminate the influence of diffraction even when used in a flat position. Specifically, when the slit plate 22B is not used, the beam spot on the target surface 26 has an intensity distribution (c), FIG. 17C, which is too complicated to render tones. By contrast, when only the light beam passed through the slit of the slit plate 22B forms a beam spot on the target surface 26, the beam spot has a smooth Gaussian intensity distribution (b), FIG. 17C, in the subscanning direction with no regard to the image height. Such a beam spot is desirable for high-density recording and tone rendering.

Figure 19A:
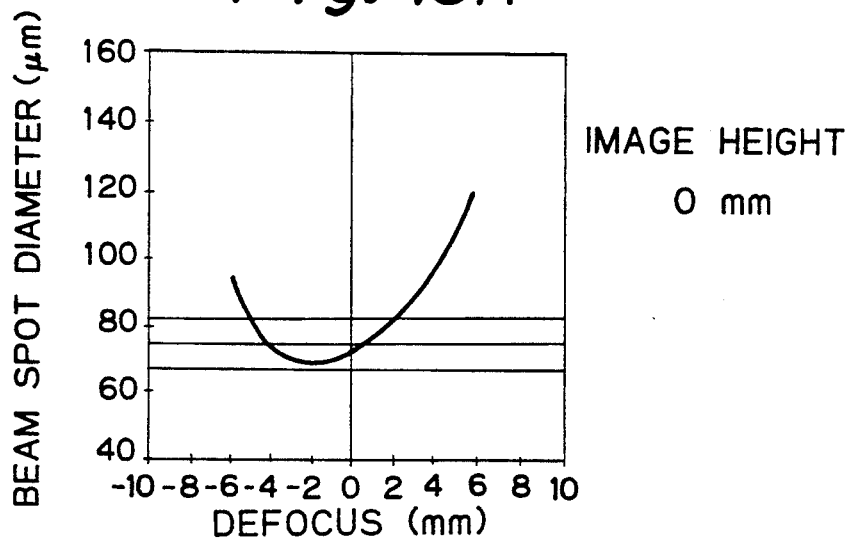
Figure 19B:
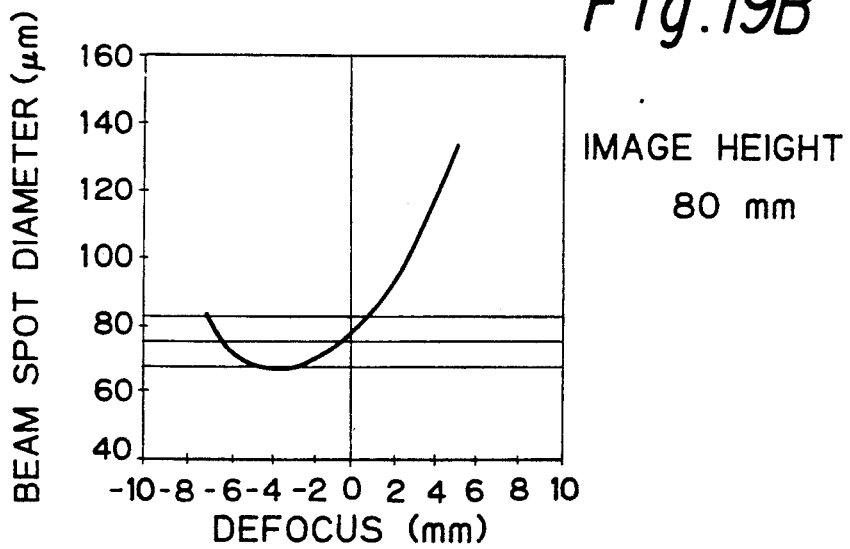
Figure 19C:
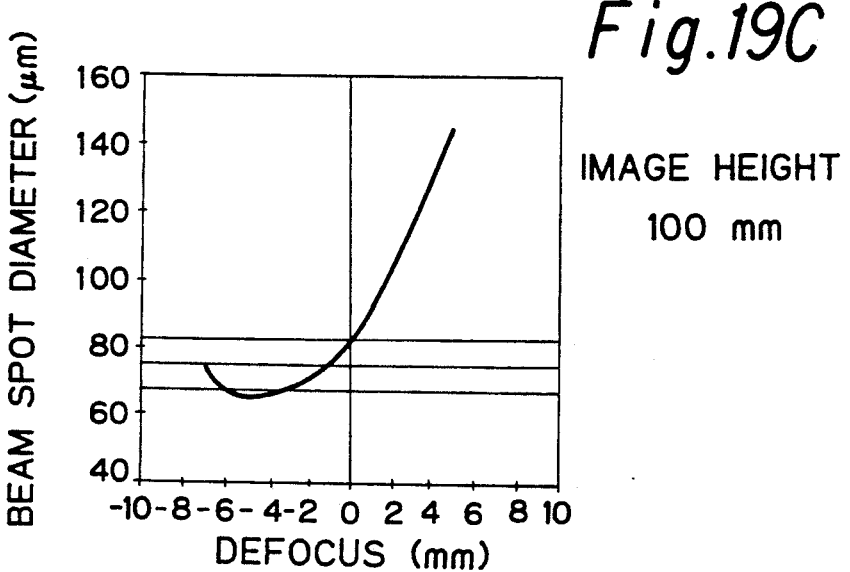
Figure 20A:
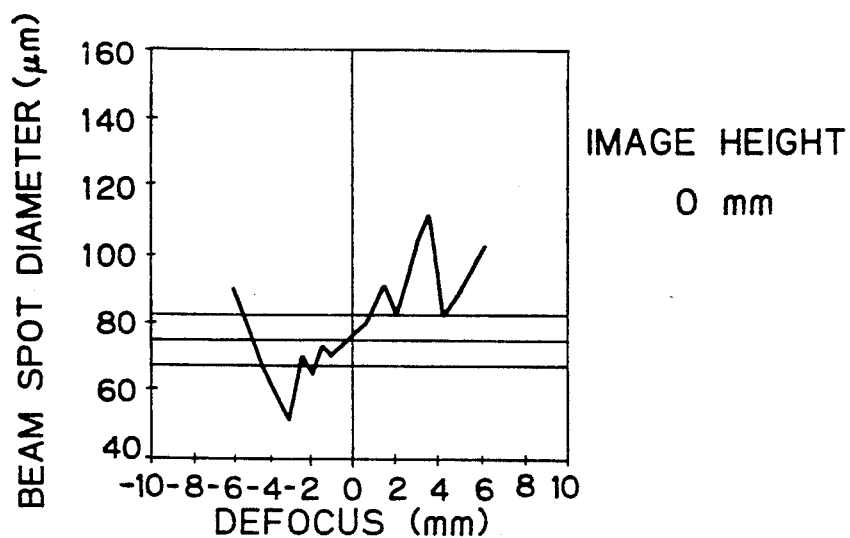
Figure 20B:
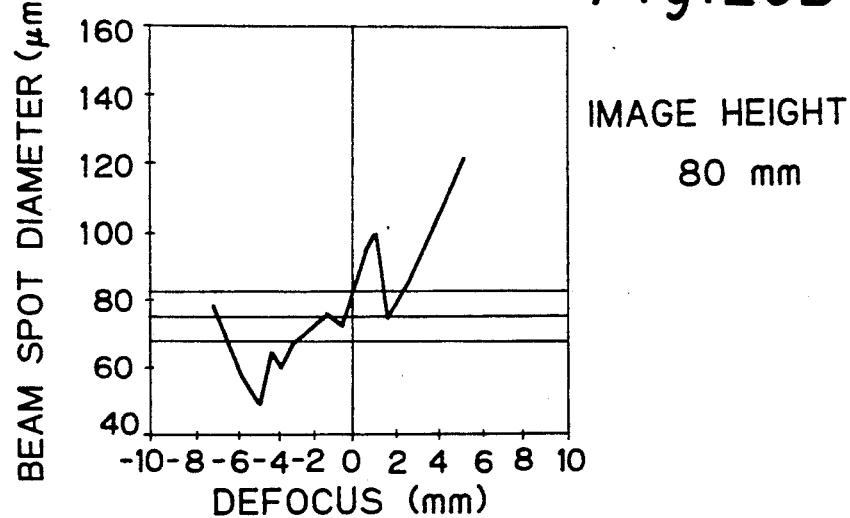
Figure 20C:
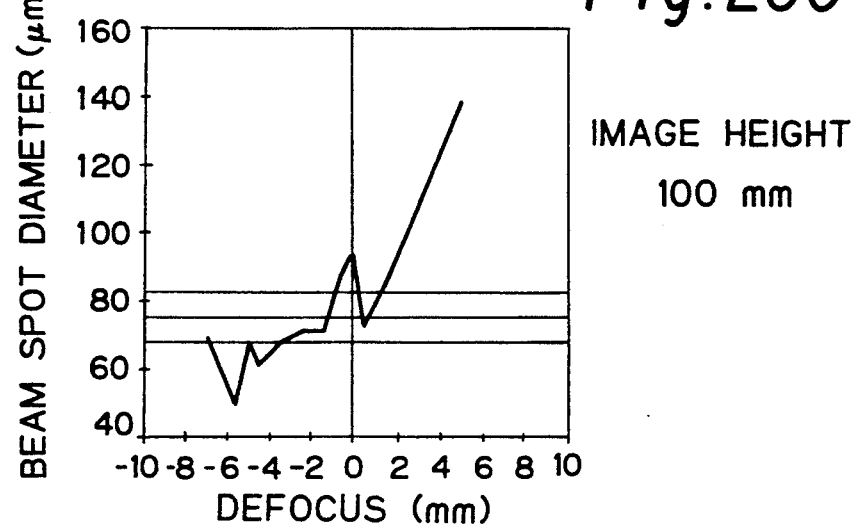
Figure 21A:
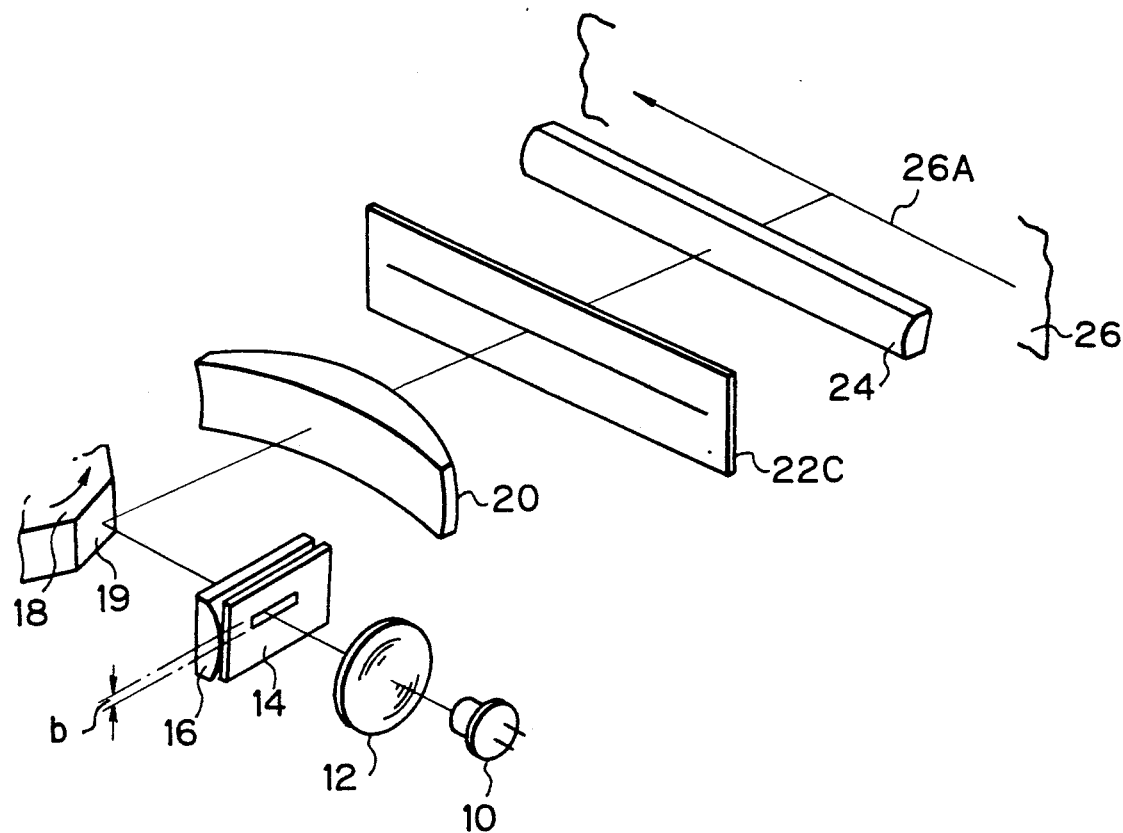
FIGS. 21A and 21B show another alternative embodiment of the present invention.
Figure 21B:
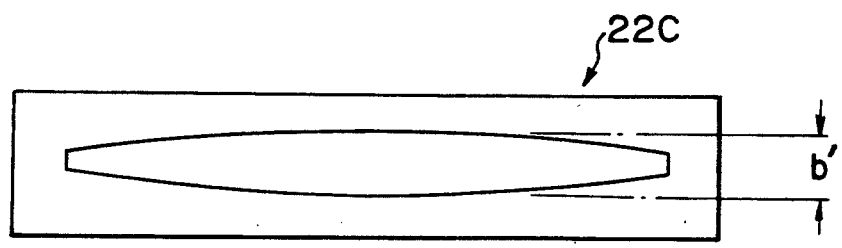

When the slit plate 22B is not used, the diameter of the beam spot has a depth characteristic shown in FIGS. 20A-20C in the subscanning direction. As FIGS. 20A-20C indicate, the beam spot diameter (microns) represented by the ordinate noticeably fluctuates together with the amount of defocus (millimeters) even in the vicinity of the focusing position. When the diffracted part is intercepted by the slit plate 22B, the fluctuation of the beam spot diameter in the vicinity of the focusing point is effectively reduced. However, when the slit plate 22B is not curved, i.e., it intercepts the diffracted light uniformly, the depth is not sufficient when the image light is 100 millimeters, as shown in FIGS. 19A–19C. Assume that the composite focal distance of the optics made up of the lenses 16, 20 and 24 is f, that the distance between the aperture member 14 and the front principle point of the optics is $d_1$, and that the distance between the rear principle point of the optics and the target surface 26 is $d_2$. Then, the composite focal distance f and distances $d_1$ and $d_2$ have particular values when the image height is zero, 80 millimeters and 100 millimeters, as listed below:

| image height | f | $d_1$ | $d_2$ |
| --- | --- | --- | --- |
| 0 mm | 89.971 | 639.793 | 107.703 |
| 80 mm | 82.660 | 573.011 | 98.754 |
| 100 mm | 71.520 | 472.514 | 84.444 |

As a result, in this embodiment, the tendency of the light beam to converge between the lenses 20 and 24 in the direction corresponding to subscanning increases with the increase in image height. For this reason, the slit plate 22B is so curved as to be concave toward the lens 20, as shown in FIG. 17A. With such a configuration, the slit plate 22B successfully removes the diffracted part of the light beam neither more nor less with no regard to the image height. In the illustrative embodiment, the slit plate 22B is located at a distance of 10 millimeters from the lens 24 on the optical axis, i.e., with respect to zero image height. The slit plate 22B has a radius of curvature which is selected to be 280 millimeters. In this condition, the beam spot has a depth characteristic shown in FIGS. 18A–18C. In FIGS. 18A–18C, the beam spot diameter (ordinate) measured at zero depth is substantially the same throughout the image heights of zero, 80 millimeters and 100 millimeters, and the beam spot diameter changes slowly in association with the defocus.

Figure 22A:
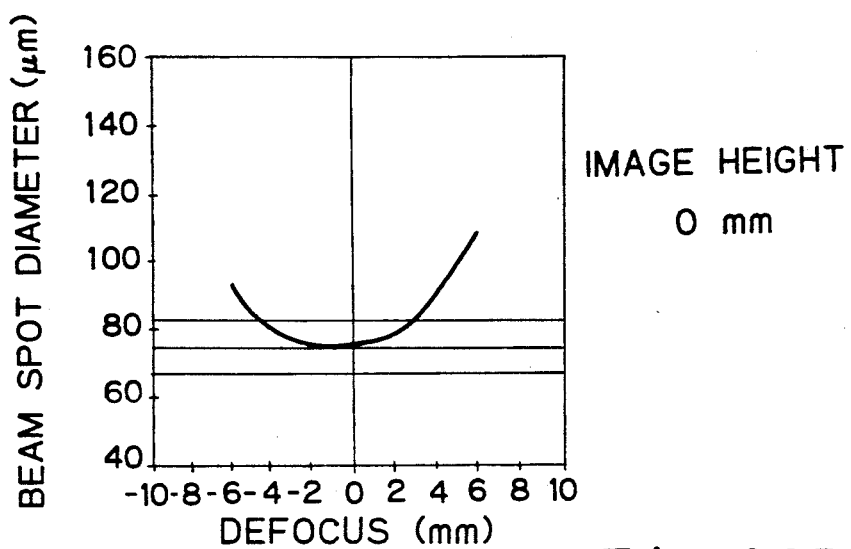
FIGS. 22A-22C show a depth characteristic relating to the embodiment of FIGS. 21A and 21B.
Figure 22B:
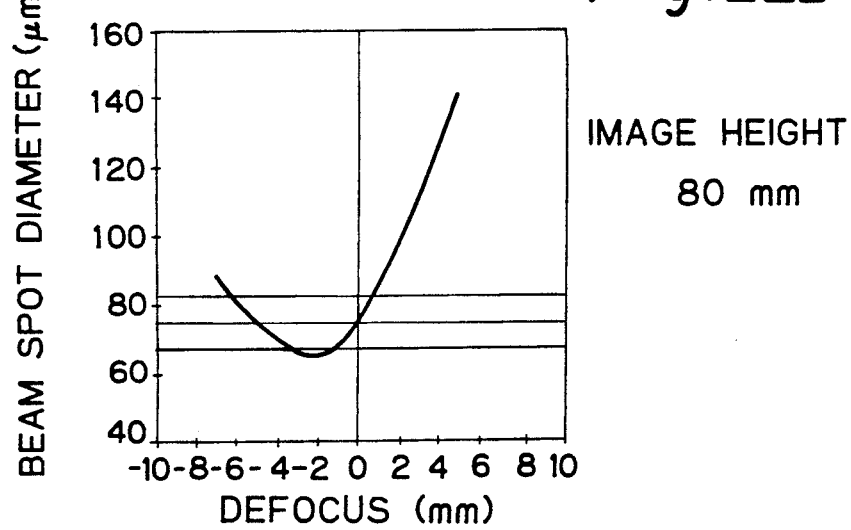
Figure 22C:
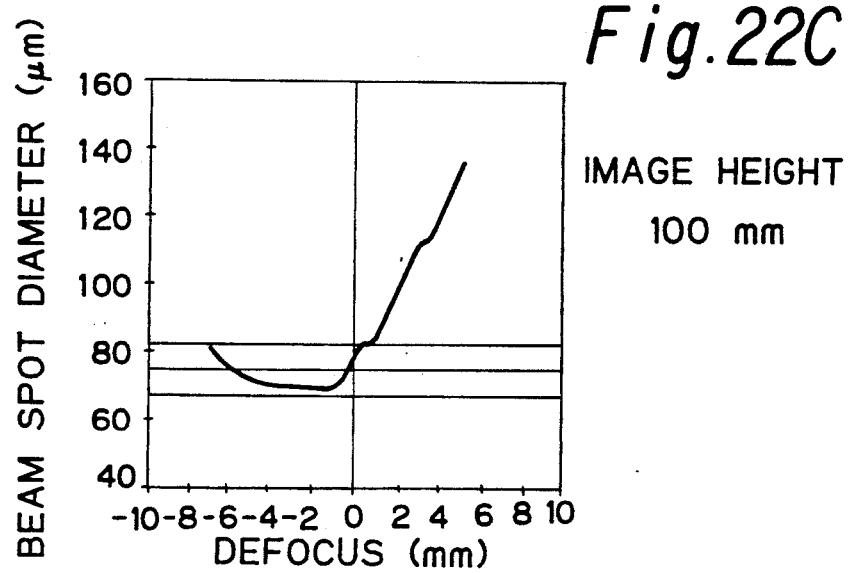

A reference will be made to FIGS. 21A–22C for describing another alternative embodiment of the present invention. In the figures, the same components are designated by the same reference numerals, and redundant description will be avoided for simplicity. This embodiment is identical with the embodiment of FIGS. 17A–17C except for a slit plate 22C. As shown, the slit plate 22C is flat and has an elongate slit which extends in the direction corresponding to main scanning. The deflected light beam tends to converge more between the f-theta lens 20 and the anamorphic lens 24 in the direction corresponding to subscanning as the image height increases, as stated previously. Hence, the width of the slit is sequentially reduced from the center toward opposite ends in order to remove the diffracted part of the light beam neither more nor less in association with the image height. Specifically, the slit plate 22C is spaced apart by 80 millimeters from the entrance surface of the lens 24 toward the lens 20 and positioned perpendicular to the developed optical axis. The slit of the slit plate 22C is elongate in the direction corresponding to main scanning. In this condition, since the distance between the first minimums of the intensity distribution in the subscanning direction is 0.7 millimeter with respect to the optical axis, the width b′ of the slit as measured at the center of the slit is selected to be 0.7 millimeter. The slit width sequentially decreases toward opposite ends of the slit and is 0.6 millimeter for the image height of 100 millimeters. The resultant depth characteristic of the beam spot is shown in FIGS. 22A and 22B, respective. When use is made of a slit plate whose slit is 0.7 millimeter throughout the length, the beam spot has a depth characteristic as in FIG. 22C; the beam spot diameter noticeably changes due to defocus in the vicinity of the focusing point. By contrast, the depth characteristic as in FIG. 22B, attainable with the slit 22C is improved over the depth characteristic shown in FIG. 22C, when the image height is 100 millimeters.

It should be noted that the specific distances and focal distances of various optical elements shown and described have their fractions omitted.

In summary, it will be seen that the present invention provides a new and useful optical scanner which performs scanning in a desirable manner and implements high-density recording by preventing the diameter of a beam spot from changing complicatedly in association with defocus due to the influence of diffraction by an aperture member. In addition, since the optical scanner of the present invention provides a beam spot with a smooth Gaussian optical intensity distribution, it is feasible for an application of the kind rendering tones by controlling the output of a light source.

Various modifications will become possible for those skilled in the art after receiving the teachings of the present disclosure without departing from the scope thereof.

What is claimed is:

1. An optical scanner for focusing light issued from a light source onto a target surface to form a beam spot and scanning said target surface with said beam spot, comprising:

light beam generating means for generating a light beam from the light issued from the light source;

deflecting means for reflecting said light beam from said light beam generating means and deflecting said reflected light beam;

image forming optics for focusing said light beam deflected by said deflecting means onto the target surface as a beam spot;

first aperture means interposed between said light source and said deflecting means for correcting a diameter of said beam spot; and second aperture means positioned on an optical path between said first aperture means and the target surface for intercepting, at least in a direction corresponding to subscanning, part of diffracted light from said first aperture means which is located outwardly of first minimums appearing on an optical intensity distribution representative of said diffracted light.

2. A scanner as claimed in claim 1, wherein said second aperture means comprises a slit plate having a slit which is elongate in a direction corresponding to main scanning.

3. A scanner as claimed in claim 2, wherein said slit plate has a slit width which is substantially equal to, when image height is zero, a distance between the first minimums of said diffracted light from said first aperture member in said direction corresponding to subscanning, said slit plate being curved in a direction corresponding to main scanning to intercept part of said diffracted light which lies outwardly of the first minimums with no regard to image height.

4. A scanner as claimed in claim 2, wherein said slit plate has a slit width which sequentially changes in a lengthwise direction of a slit to intercept part of said diffracted light which lies outwardly of the first minimums with no regard to image height.

5. A scanner as claimed in claim 1, wherein said deflecting means comprises a rotary polygonal mirror.

6. A scanner as claimed in claim 1, wherein said image forming optics comprise an elongate anamorphic lens located in close proximity to the target surface and elongate in a direction corresponding to main scanning.

7. A scanner as claimed in claim 6, wherein a screening layer having a slit which is elongate in said direction corresponding to main scanning is formed on a lens surface of said elongate anamorphic lens, whereby said anamorphic lens bifunctions as said second aperture means.

8. A scanner as claimed in claim 1, wherein said image forming optics comprise an elongate mirror interposed between said deflecting means and the target surface and elongate in a direction corresponding to main scanning.

9. A scanner as claimed in claim 1, wherein said image forming optics comprise an f-theta lens.

10. An optical scanner for focusing light issued from a light source onto a target surface to form a beam spot and scanning said target surface with said beam spot, comprising:
    light beam generating means for generating a light beam from the light issued from the light source;
    a rotary polygonal mirror for reflecting said light beam from said light beam generating means and deflecting said reflected light beam;
    image forming optics for focusing said light beam deflected by said rotary polygonal mirror onto the target surface as a beam spot;
    an aperture means interposed between said light source and said deflecting means for diffracting said light beam and thereby correcting a diameter of said beam spot,
    wherein said rotary polygonal mirror has reflective surfaces each having a width which is substantially equal to a distance between first minimums appearing on an optical intensity distribution representative of said diffracted light beam in a direction corresponding to subscanning, said polygonal mirror positioned on an optical path between said aperture means and the target surface for intercepting, at least in said direction corresponding to subscanning, part of said diffracted light beam which is located inwardly of said first minimums appearing on said optical intensity distribution.

11. An optical scanner for focusing light issued from a light source onto a target surface to form a beam spot and scanning said target surface with said beam spot, comprising:
    light beam generating means for generating a light beam from the light issued from the light source;
    deflecting means for reflecting said light beam from said light beam generating means and deflecting said reflected light beam;
    image forming optics for focusing said light beam deflected by said deflecting means onto the target surface as a beam spot; and
    an aperture means interposed between said light source and said deflecting means for diffracting said light beam and thereby correcting a diameter of said beam spot,
    wherein said image forming optics comprise an elongate mirror interposed between said deflecting means and the target surface and elongate in a direction corresponding to main scanning, said elongate mirror having a reflective surface with a width in a subscanning direction which is substantially equal to a distance between first minimums appearing on an optical intensity distribution representative of said diffracted light in said subscanning direction, whereby said elongate mirror is positioned on an optical path between said aperture means and the target surface for intercepting, at least in said direction corresponding to subscanning, part of said diffracted light beam which is located inwardly of said first minimums appearing on said optical intensity distribution.

12. A scanner as claimed in claim 11, wherein said elongate mirror comprises a concave cylindrical mirror which substantially focuses said deflected light beam onto the target surface in said direction corresponding to subscanning.

13. A scanner as claimed in claim 11, wherein said image forming optics comprise:
    an elongate anamorphic lens located in close proximity to the target surface and elongate in said direction corresponding to main scanning; and
    an elongate flat mirror positioned at opposite side to the target surface with respect to said elongate anamorphic lens.

14. An optical scanner for focusing light issued from a light source onto a target surface to form a beam spot and scanning said target surface with said beam spot, comprising:
    light beam generating means for generating a light beam from the light issued from the light source;
    deflecting means for reflecting said light beam from said light beam generating means and deflecting said reflected light beam;
    image forming optics for focusing said light beam deflected by said deflecting means onto the target surface as a beam spot; and
    an aperture means interposed between said light source and said deflecting means for diffracting said light beam and thereby correcting a diameter of said beam spot,
    wherein said image forming optics comprise an f-theta lens with a predetermined lens surface having an aperture with a width in a direction corresponding to subscanning which is substantially equal to a distance between first minimums of said diffracted light beam appearing on an optical intensity distribution representative of said diffracted light beam in a direction corresponding to subscanning, whereby said f-theta lens is positioned on an optical path between said aperture means and the target surface for intercepting, at least in said direction corresponding to subscanning, part of said diffracted light beam which is located outwardly of said first minimums appearing on said optical intensity distribution.

15. A scanner as claimed in claim 14, wherein a screening layer for defining said aperture width is provided on said predetermined lens surface of said f-theta lens.

16. A scanner as claimed in claim 14, wherein said f-theta lens has a width in said direction corresponding to subscanning which is equal to said aperture width.

* * * * *